United States Patent
Tokunaga et al.

(10) Patent No.: US 10,362,028 B2
(45) Date of Patent: Jul. 23, 2019

(54) INFORMATION PROCESSING APPARATUS

(71) Applicant: Sony Interactive Entertainment Inc., Tokyo (JP)

(72) Inventors: Nodoka Tokunaga, Tokyo (JP); Keigo Tamura, Tokyo (JP); Shoichi Ikenoue, Tokyo (JP); Tomohiro Ogawa, Kanagawa (JP); Yoshihiko Suwa, Kanagawa (JP); Akitsugu Tsuchiya, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 88 days.

(21) Appl. No.: 15/032,136

(22) PCT Filed: Oct. 31, 2014

(86) PCT No.: PCT/JP2014/005530
§ 371 (c)(1),
(2) Date: Apr. 26, 2016

(87) PCT Pub. No.: WO2015/068371
PCT Pub. Date: May 14, 2015

(65) Prior Publication Data
US 2016/0301692 A1   Oct. 13, 2016

(30) Foreign Application Priority Data
Nov. 7, 2013   (JP) .................................. 2013-231102

(51) Int. Cl.
*H04L 29/06* (2006.01)
*G06F 21/32* (2013.01)
(Continued)

(52) U.S. Cl.
CPC ........ *H04L 63/0861* (2013.01); *A63F 13/213* (2014.09); *A63F 13/71* (2014.09);
(Continued)

(58) Field of Classification Search
CPC ....... G06F 21/31; G06F 21/32; H04L 63/083; H04L 63/08; H04L 63/102;
(Continued)

(56) References Cited

U.S. PATENT DOCUMENTS 7,412,081 B2 *   8/2008   Doi ......................... G06F 21/32
                                                      382/115
8,073,207 B2 *  12/2011   Ayaki ..................... G06K 9/228
                                                      348/E5.138
(Continued)

FOREIGN PATENT DOCUMENTS

CN      102201055 A     9/2011
CN      103294945 A     9/2013
(Continued)

OTHER PUBLICATIONS

International Search Report for corresponding Application PCT/JP2014/005530, 2 pages, dated Jan. 20, 2015.
(Continued)

*Primary Examiner* — Farid Homayounmehr
*Assistant Examiner* — Sanchit K Sarker
(74) *Attorney, Agent, or Firm* — Matthew B. Dernier, Esq.

(57) ABSTRACT

A picked up image displaying unit displays a picked up image on a display unit. A face authentication unit detects a face image of a registered user existing in the picked up image using face identification data retained in a registered user information retaining block. A position designation image processing unit displays a position designation image for designating a position of an object for the detected registered user on the display unit. An object authentication unit detects that an object image is included in the region designated by the position designation image.

7 Claims, 18 Drawing Sheets

(51) Int. Cl.
*G06K 9/00* (2006.01)
*A63F 13/213* (2014.01)
*A63F 13/79* (2014.01)
*A63F 13/71* (2014.01)
*H04N 5/232* (2006.01)

(52) U.S. Cl.
CPC .............. *A63F 13/79* (2014.09); *G06F 21/32* (2013.01); *G06K 9/00228* (2013.01); *G06K 9/00912* (2013.01); *H04L 63/102* (2013.01); *H04N 5/23293* (2013.01)

(58) Field of Classification Search
CPC ............ H04L 63/0815; H04L 63/0861; H04N 5/23293; A63F 13/71; A63F 13/213; A63F 13/79; G06K 9/00912; G06K 9/00228
USPC .......................................................... 726/7
See application file for complete search history.

(56) References Cited

U.S. PATENT DOCUMENTS

| | | | |
|---|---|---|---|
| 8,416,998 | B2 | 4/2013 | Ichikawa |
| 8,568,230 | B2 | 10/2013 | Marks |
| 2004/0017473 | A1* | 1/2004 | Marks ................... G06F 3/017 348/207.1 |
| 2004/0062423 | A1* | 4/2004 | Doi ................... G06K 9/00221 382/118 |
| 2007/0266312 | A1* | 11/2007 | Ayaki ................... G06K 9/228 715/273 |
| 2008/0181460 | A1* | 7/2008 | Tamaru ............. G06K 9/00248 382/103 |
| 2008/0317339 | A1* | 12/2008 | Steinberg ............. G06K 9/0061 382/167 |
| 2009/0220128 | A1* | 9/2009 | Irimoto .............. G06K 9/00255 382/118 |
| 2010/0056277 | A1 | 3/2010 | Marks |
| 2011/0235870 | A1 | 9/2011 | Ichikawa |
| 2012/0050769 | A1* | 3/2012 | Houjou ............. G06K 9/00221 358/1.9 |
| 2012/0135799 | A1* | 5/2012 | Okada ................... G07F 17/32 463/25 |
| 2012/0235790 | A1* | 9/2012 | Zhao ....................... G06F 21/32 340/5.83 |
| 2012/0319815 | A1* | 12/2012 | Feldman ............ G06Q 30/0185 340/5.8 |
| 2013/0104205 | A1* | 4/2013 | Hsi ........................ G06F 21/32 726/6 |
| 2013/0169839 | A1* | 7/2013 | Takahashi ................ H04N 5/76 348/231.99 |
| 2013/0169850 | A1 | 7/2013 | Oyama |
| 2013/0202160 | A1 | 8/2013 | Yoshizawa |
| 2014/0109208 | A1* | 4/2014 | Song ....................... G06F 21/36 726/7 |
| 2014/0152854 | A1* | 6/2014 | Iwaki ................. H04N 1/00244 348/207.1 |
| 2015/0049922 | A1* | 2/2015 | Miller ................ G06K 9/00255 382/118 |
| 2015/0206010 | A1* | 7/2015 | Ueno ................. G06K 9/00671 345/633 |
| 2016/0127697 | A1* | 5/2016 | Cho ....................... G06F 16/739 348/211.2 |
| 2016/0217198 | A1* | 7/2016 | Lee ....................... G06N 3/0454 |
| 2016/0301692 | A1* | 10/2016 | Tokunaga ............... G06F 21/32 |
| 2017/0255767 | A1* | 9/2017 | Ren .......................... G06F 21/32 |

FOREIGN PATENT DOCUMENTS

| | | |
|---|---|---|
| EP | 1291807 A2 | 3/2003 |
| JP | 2007096890 A | 4/2007 |
| JP | 2009519105 A | 5/2009 |
| JP | 2009211166 A | 9/2009 |
| JP | 2013141091 A | 7/2013 |
| WO | 2007078639 A | 7/2007 |

OTHER PUBLICATIONS

European Search Report for corresponding EP Application 14860210.5, 7 pages, dated May 8, 2017.
International Preliminary Report on Patentability and Written Opinion for corresponding Application PCT/JP2014/005530, 12 pages, dated May 19, 2016.
Office Action for corresponding CN Application 201480059948.2, 14 pages, dated Jan. 9, 2018.
Office Action for corresponding EP Application 14860210.5, 9 pages, dated May 28, 2019.

\* cited by examiner

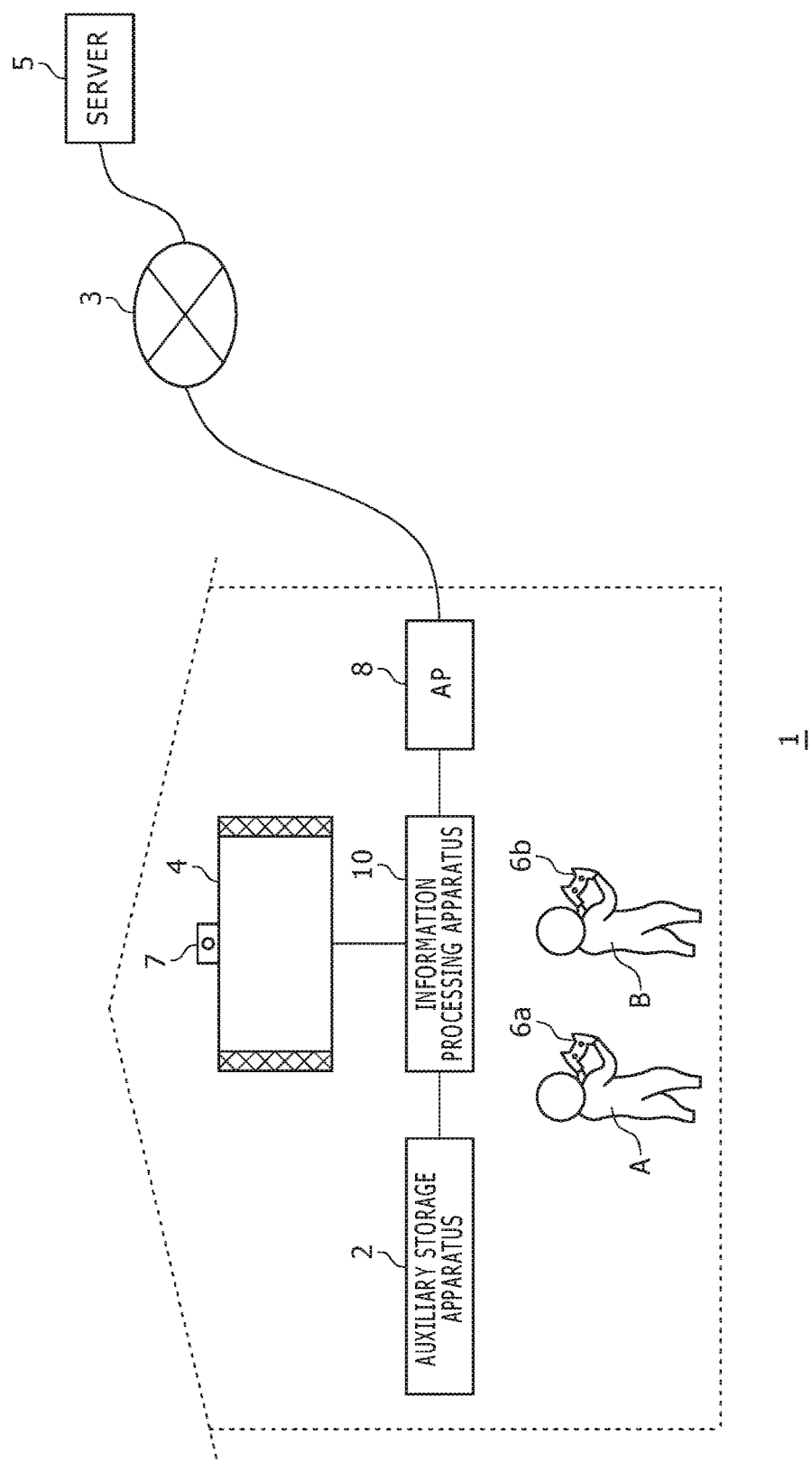

FIG.2
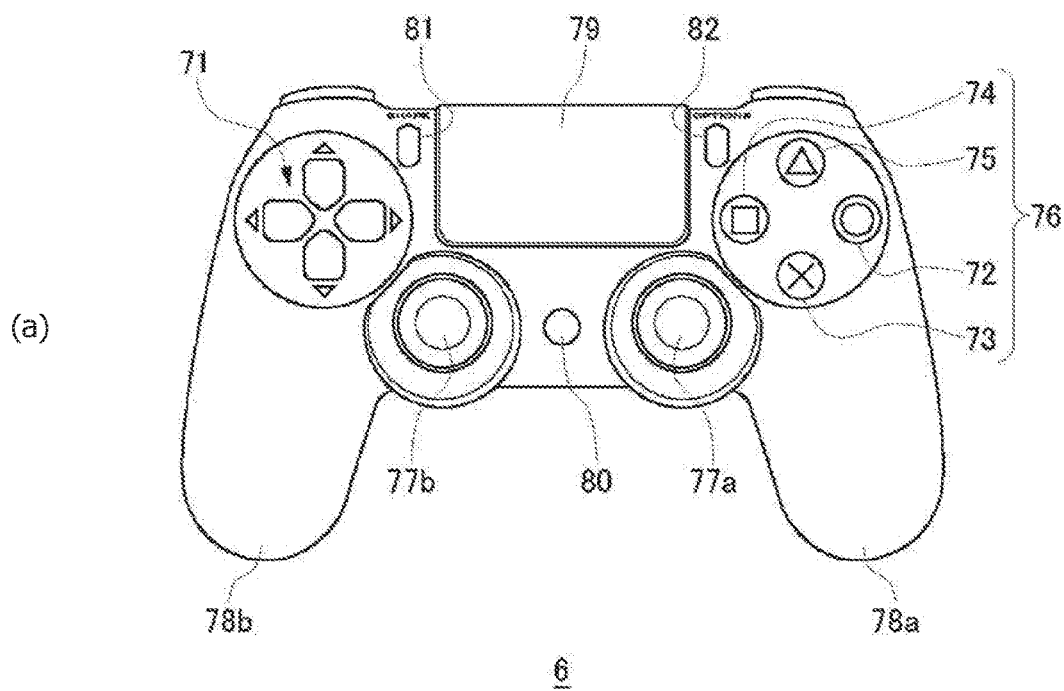
(a)
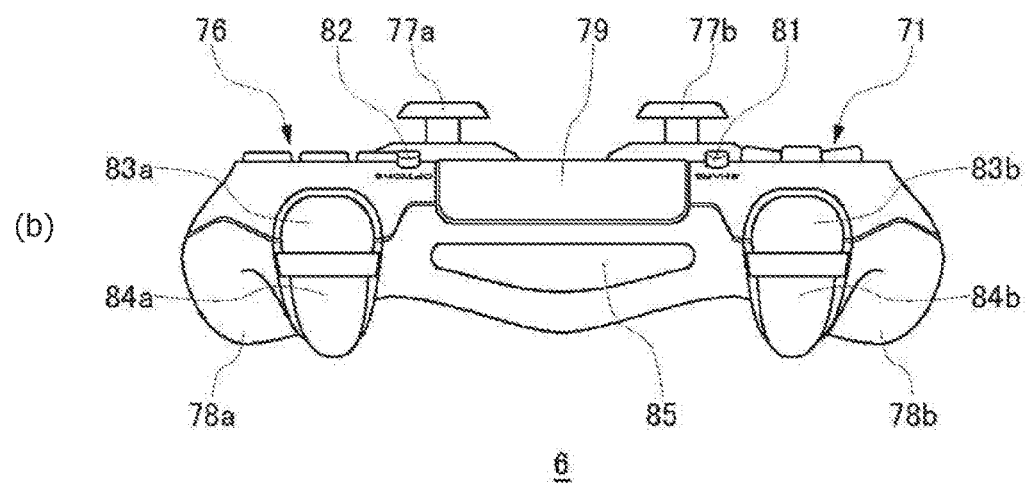
(b)

🎮 THE CONTROLLER IS CONNECTED.
WHO USES THIS CONTROLLER?

200

| HANAKO | SACHIKO | JIRO | SABURO |

202

👪 A REGISTERED FACE IS BEING SOUGHT.

⊗ CANCEL    ⊙ DETERMINE

<u>4</u>

(b)

INPUT YOUR LOGIN PASS CORD.

HANAKO    [*]  [*]  [ ]  [ ]

⊗ CANCEL

<u>4</u>

7

136

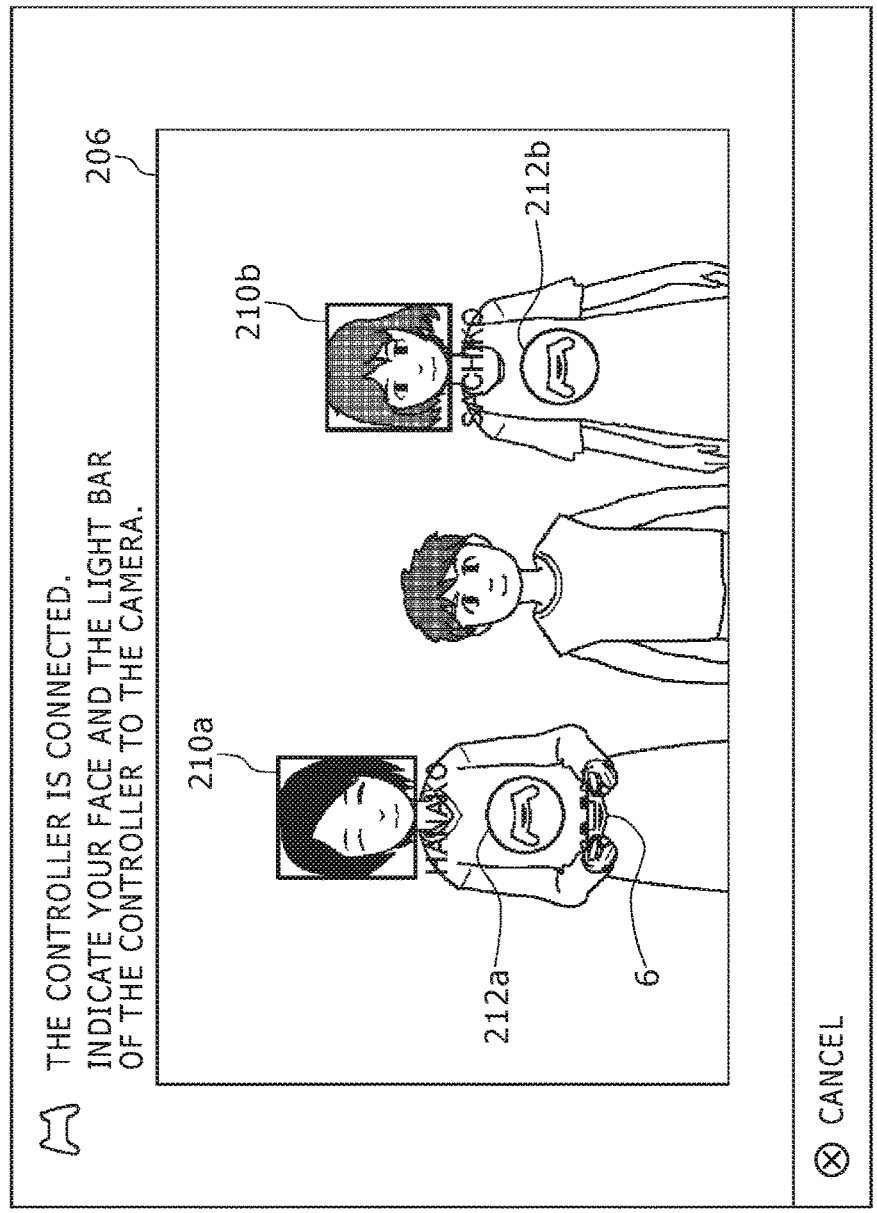

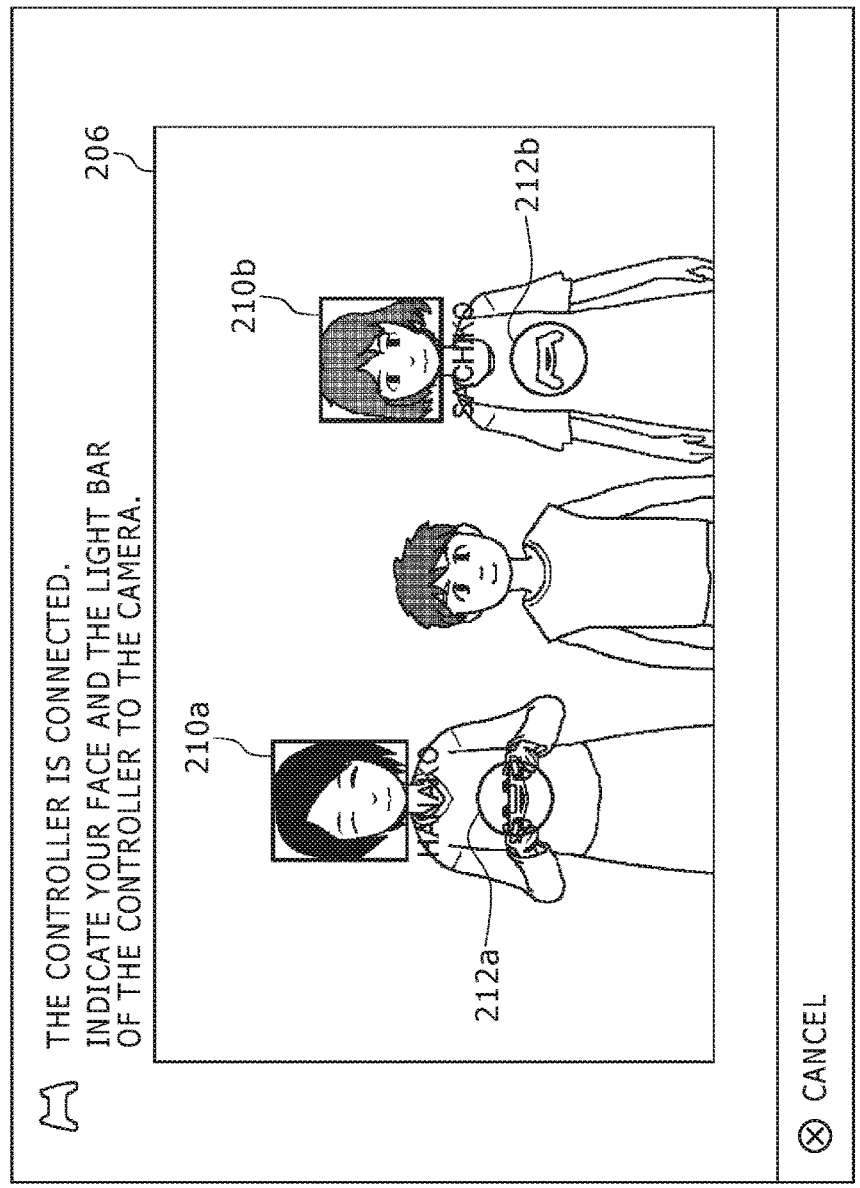

F I G . 1 1
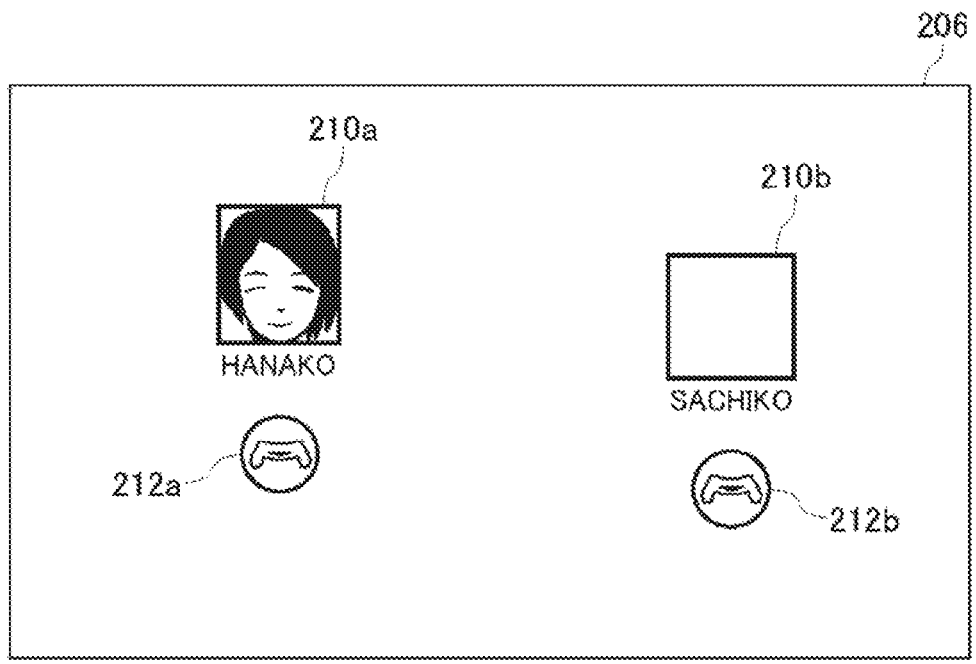

FIG.12
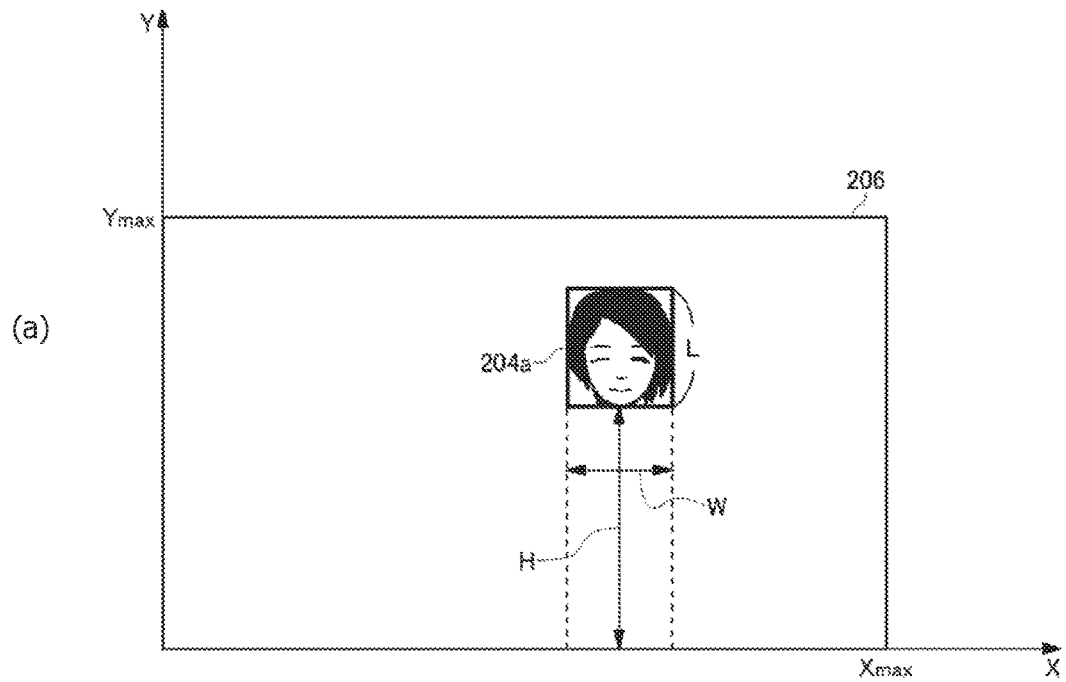
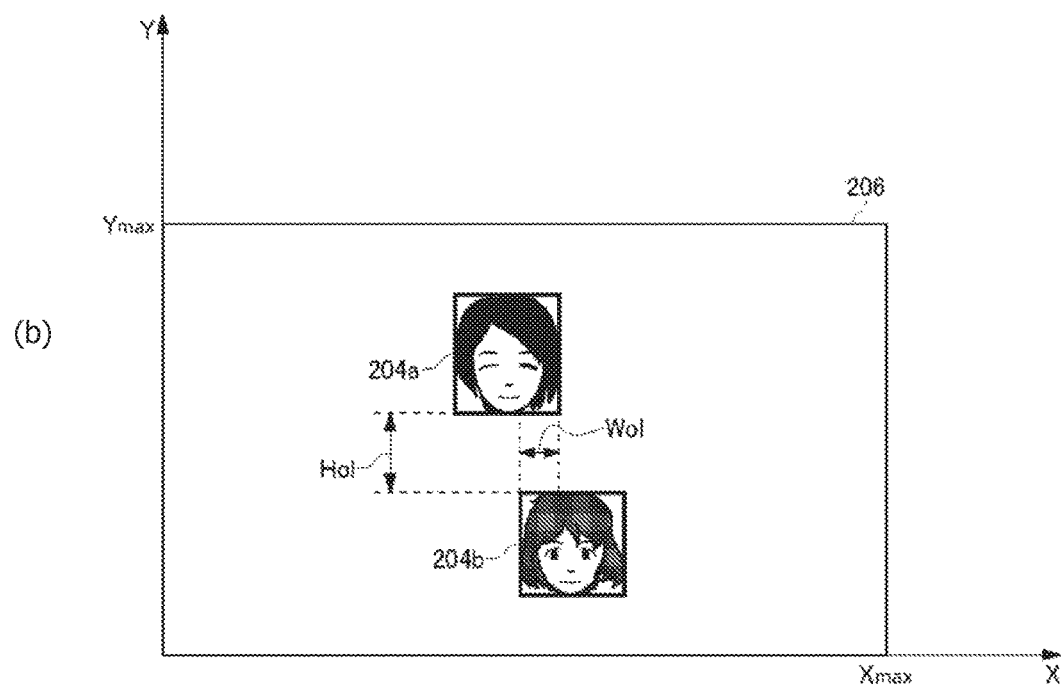

FIG.14
(a) 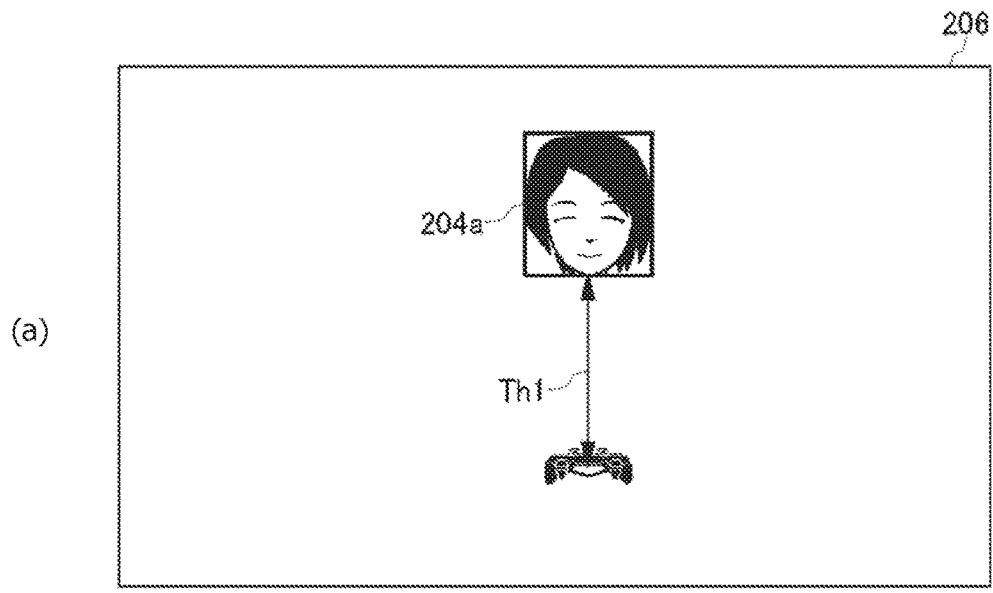
(b) 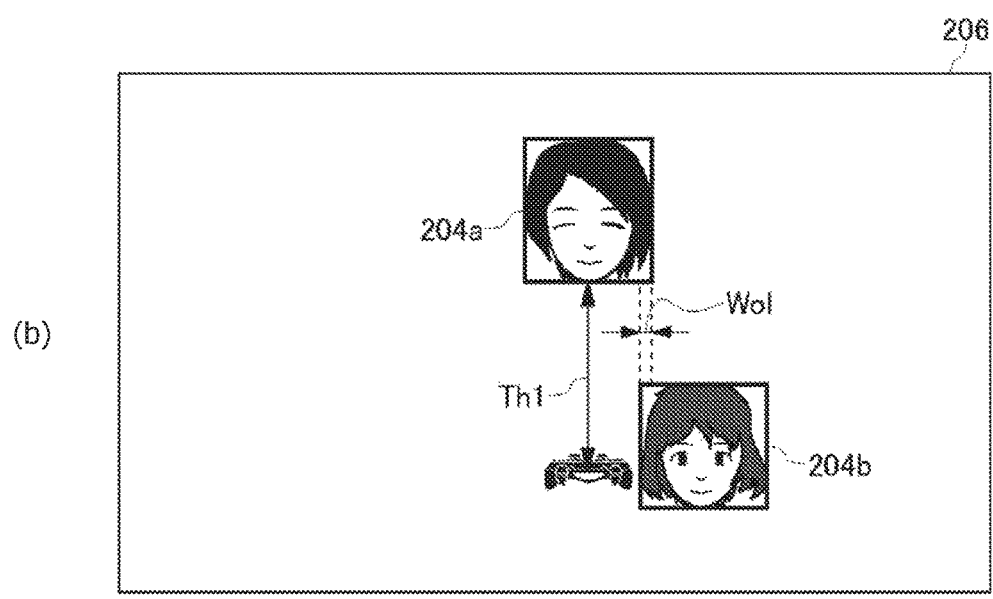

FIG.15
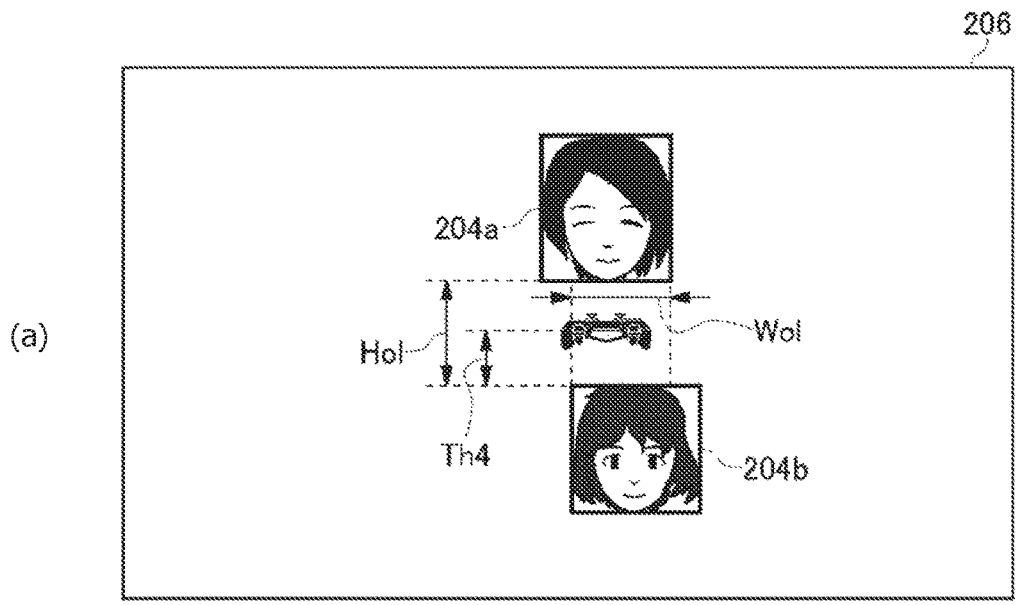
(a)
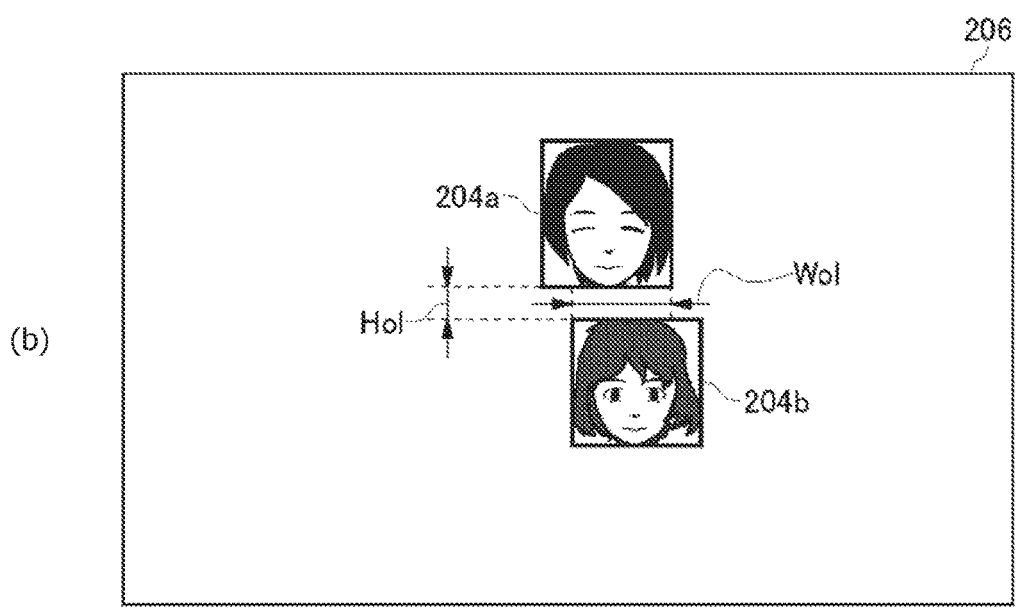
(b)

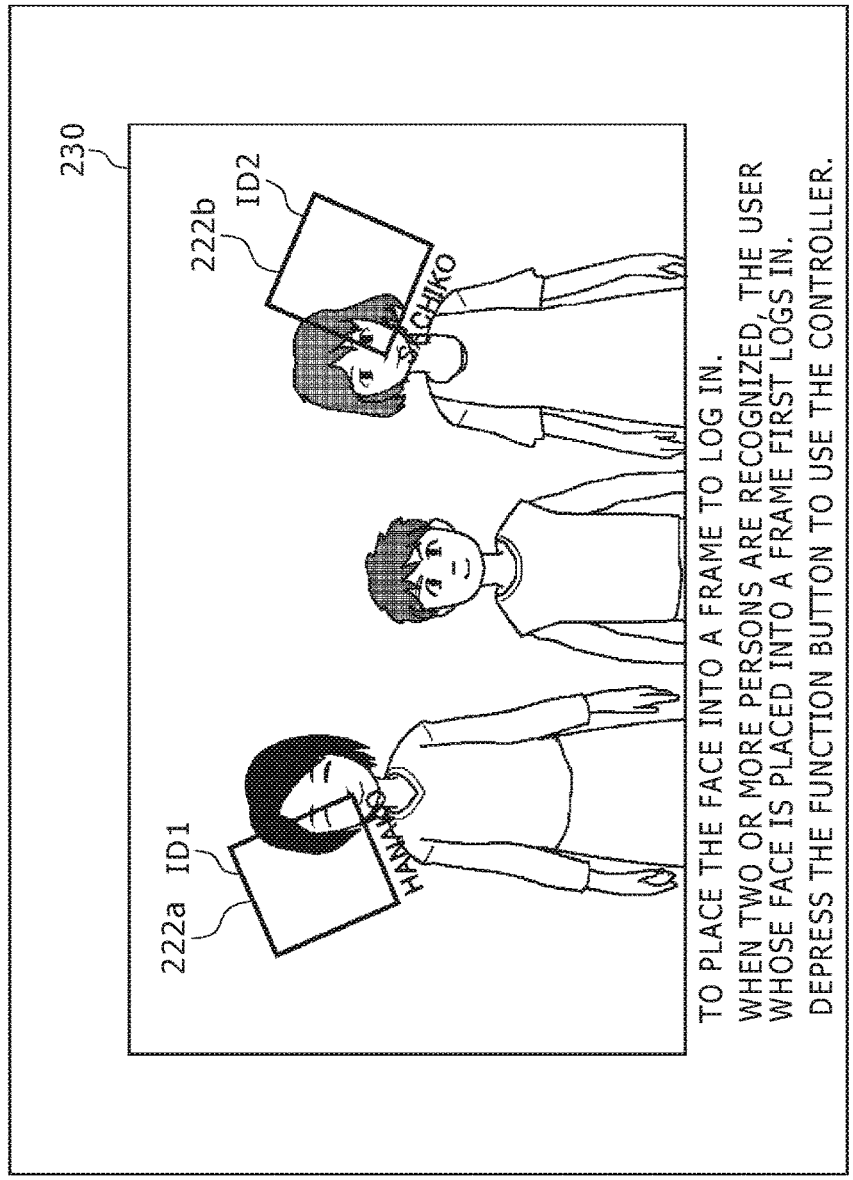

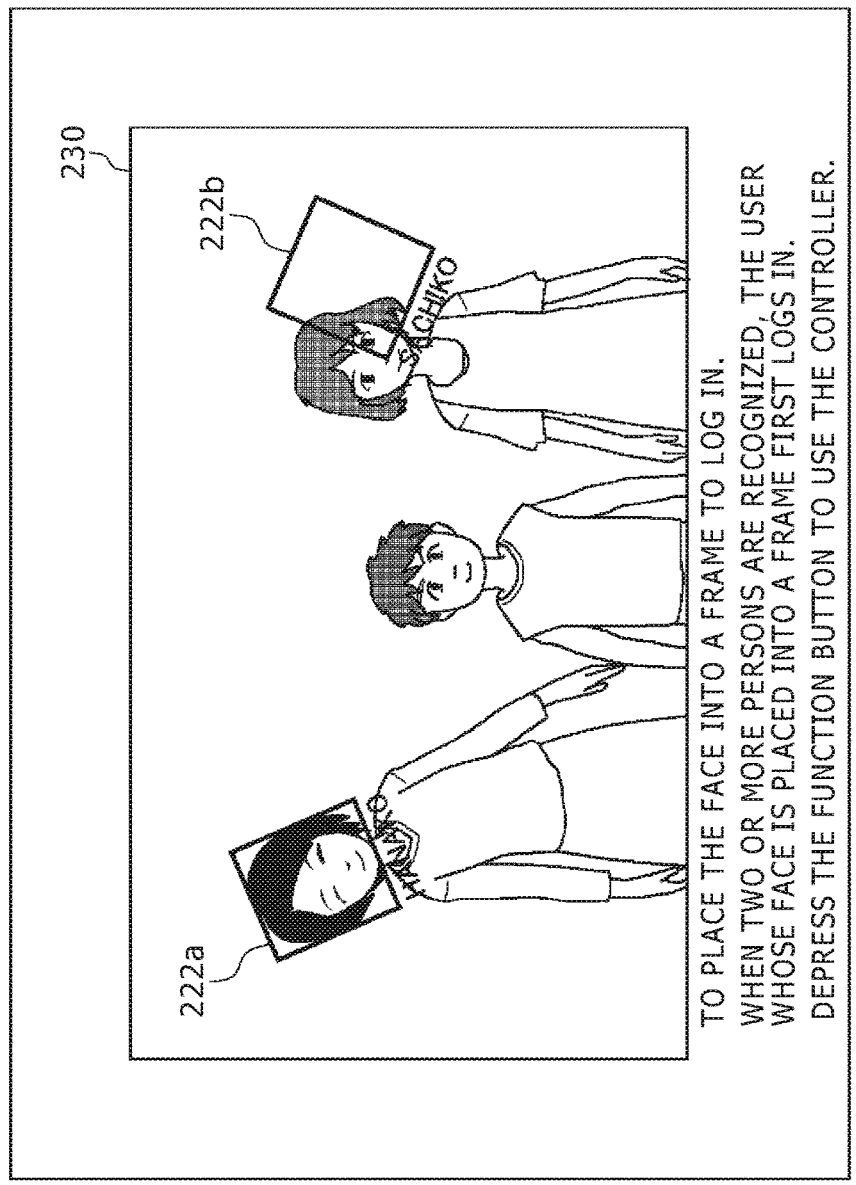

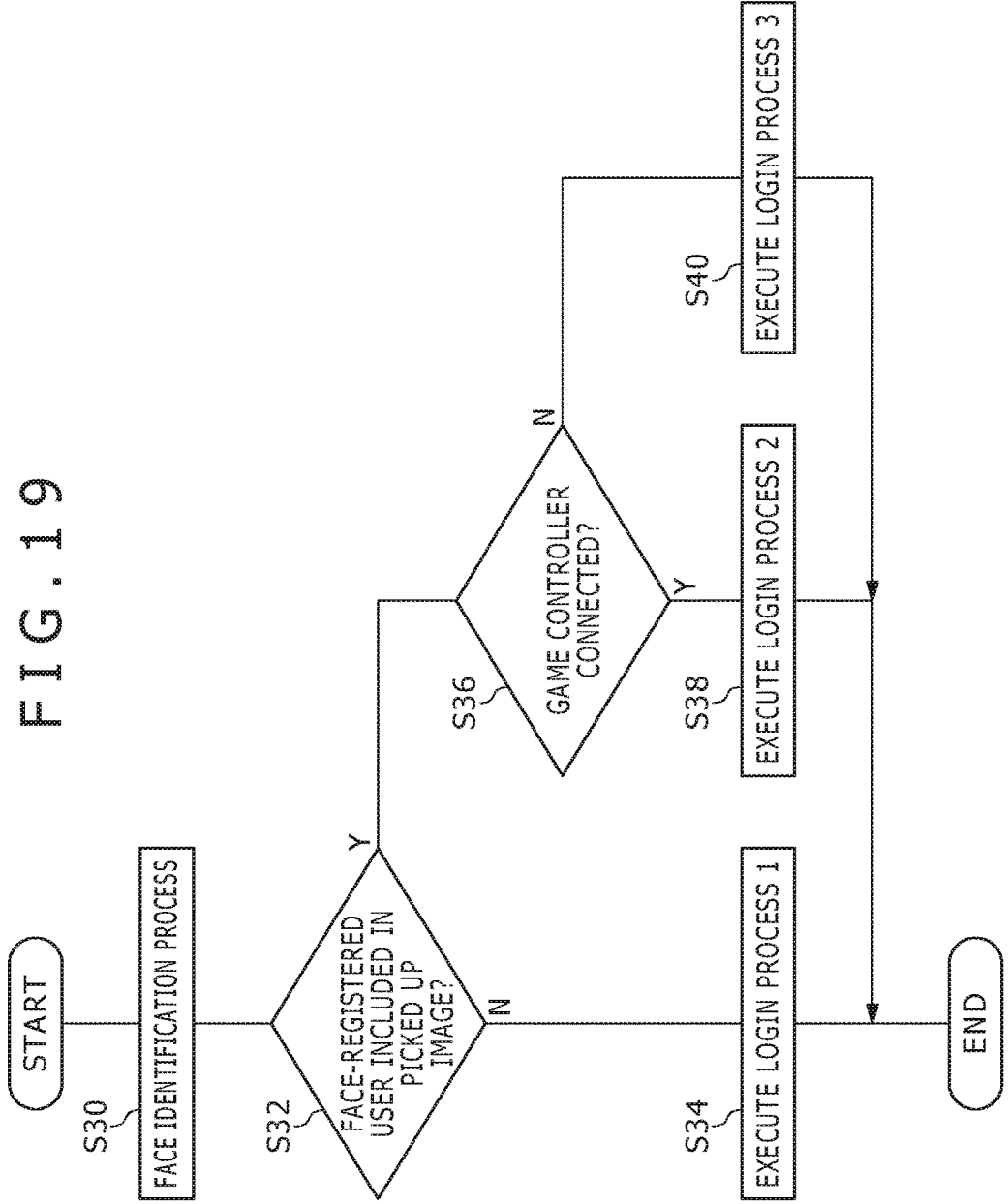

INFORMATION PROCESSING APPARATUS

TECHNICAL FIELD

The present invention relates to an information processing apparatus which carries out a user authentication process.

BACKGROUND ART

When a user logs in to an information processing apparatus such as a game apparatus, the information processing apparatus carries out a user authentication process for identifying whether or not the user who tries to log in is a user registered in advance. Various types are available for user authentication, and user authentication by a password is widely used conventionally.

Separately from the user authentication by a password, also user authentication using user's biological information is used generally. The authentication using biological information does not require inputting of a password by a user and the labor for authentication is small.

SUMMARY

Technical Problem

In biometric authentication, particularly a face authentication system which recognizes the face of a user from a digital image is known as one of simple and convenient user authentication because basically it does not request a special action to a user. The inventor of the present invention has come to conceive a mechanism for implementing the user authentication simply and easily to allow a user to log in to an information processing apparatus by utilizing a face authentication system.

For example, as regards a game apparatus, various types of games which a user tries to play after logging in to a game apparatus are available, and also user information registered for user login in a game apparatus is sometimes small or great depending upon a user. For example, although a great number of games in which a game controller is used for operation are available, also games for which a game controller does not use exist. Further, some users have a registration of a face image for face authentication login and some other users do not have such a registration. Therefore, an information processing apparatus such as a game apparatus is preferably configured such that a suitable login process can be executed in response to such a situation of a user as described above.

Therefore, it is an object of the present invention to provide a technology for carrying out efficient user authentication.

Solution to Problem

In order to solve the problem described above, an information processing apparatus according to a certain aspect of the present invention includes a picked up image displaying unit configured to display a picked up image on a display unit, a registered user information retaining unit configured to retain face identification data of registered users, a face authentication unit configured to detect a face image of a registered user existing in the picked up image using the face identification data retained in the registered user information retaining unit, an image processing unit configured to display a position designation image for designating a position of an object for the detected registered user on the display unit, and an object authentication unit configured to detect that an object image is included in the region designated by the position designation image.

It is to be noted that also an arbitrary combination of the components described above and the representation of the present invention where it is converted between a method, an apparatus, a system, a recording medium, a computer program and so forth are effective as modes of the present invention.

BRIEF DESCRIPTION OF DRAWINGS

FIG. 1 is a view depicting an information processing system according to an embodiment of the present invention.

FIG. 2(a) is a view depicting an appearance configuration of an upper face of an inputting apparatus and FIG. 2(b) is a view depicting an appearance configuration of a back side face of the inputting apparatus.

FIGS. 6(a) and 6(b) are views depicting login screen images in a login process 1.

FIG. 9 is a view depicting a login screen image in a login process 2.

FIG. 10 is a view depicting another login screen image in the login process 2.

FIG. 11 is a view depicting an example of a login screen image.

FIG. 12(a) and FIG. 12(b) are views illustrating parameters used in a position determination algorithm.

FIGS. 14(a) and 14(b) are views depicting states in which a controller image is disposed below a face region.

FIG. 15(a) is a view depicting a view in which a controller image is disposed below a face region and FIG. 15(b) is a view depicting a state in which a controller image is not disposed.

FIG. 17 is a view depicting a login screen image in a login process 3.

FIG. 18 is a view depicting another login screen image in the login process 3.

FIG. 19 is a view depicting an execution flow chart of a login process of the present embodiment.

DESCRIPTION OF EMBODIMENT

Figure 3:
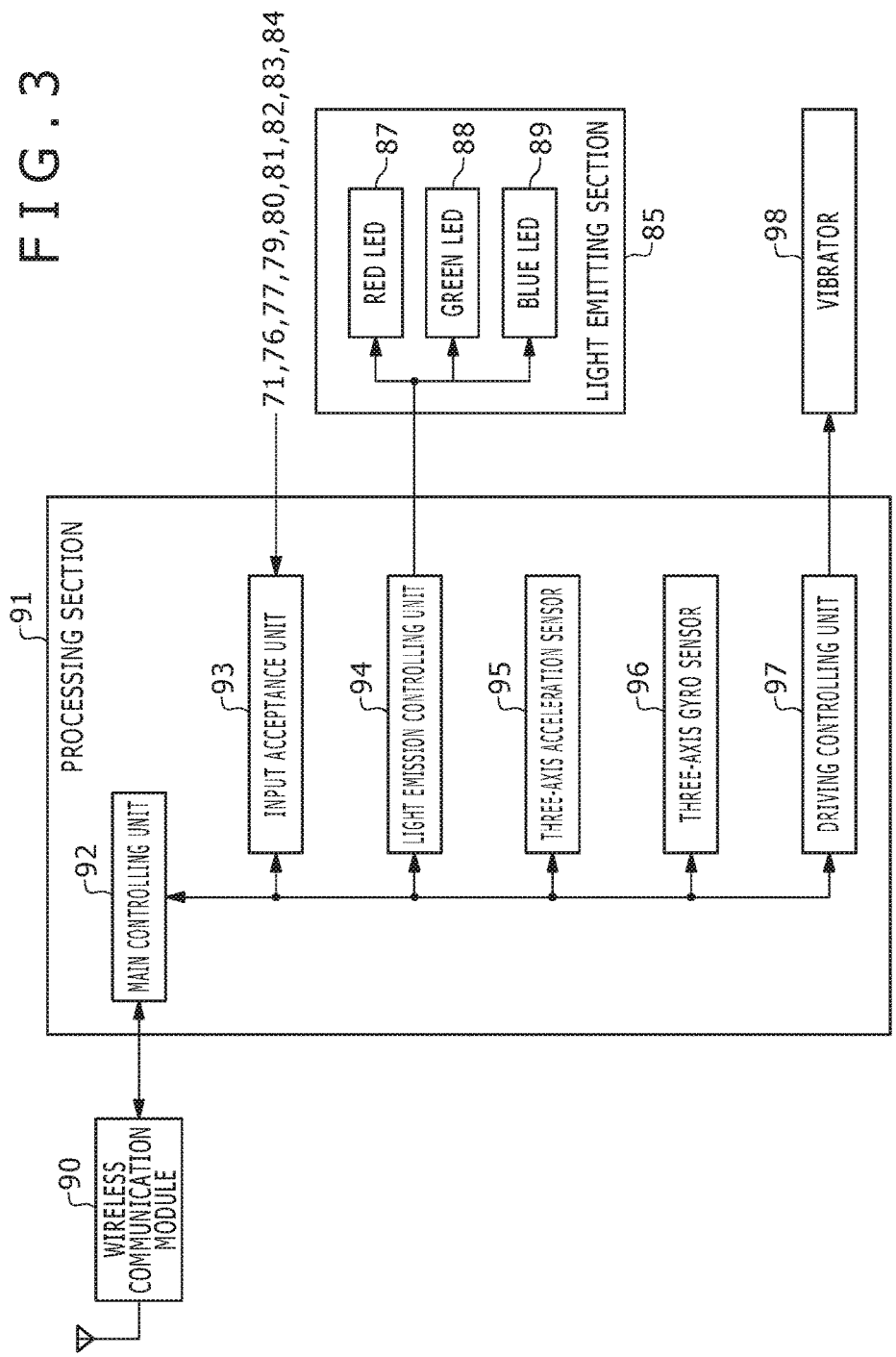
FIG. 3 is a view depicting a configuration of the inputting apparatus.

FIG. 1 depicts an information processing system 1 according to an embodiment of the present invention. The information processing system 1 includes an information processing apparatus 10 which is a user terminal, and a server 5. An access point (hereinafter referred to as "AP") 8 has functions of a wireless access point and a router, and the information processing apparatus 10 connects to the access point 8 by wireless connection or wire connection and connects the server 5 on a network 3 for communication.

An auxiliary storage apparatus 2 is a mass storage apparatus such as an HDD (hard disk drive) or a flash memory and may be an external storage apparatus which is connected to the information processing apparatus 10 by a USB (Universal Serial Bus) or the like or may be a built-in storage apparatus. An outputting apparatus 4 may be a television set having a display unit which outputs an image and a speaker which outputs sound or may be a computer display unit. The outputting apparatus 4 may be connected to the information processing apparatus 10 by a wire cable or by wireless connection. The information processing apparatus 10 is connected to an inputting apparatus 6, which is operated by a user, by wireless connection or wire connection, and the inputting apparatus 6 outputs an operation signal representative of a result of an operation by the user to the information processing apparatus 10. If the information processing apparatus 10 accepts an operation signal from the inputting apparatus 6, then it reflects the operation on processing of an OS (system software) or an application and outputs a result of processing from the outputting apparatus 4. The inputting apparatus 6 includes a plurality of inputting units such as a plurality of push-type operation buttons, an analog stick capable of inputting an analog amount and a rotary button.

If an operation signal from the inputting apparatus 6 is accepted, then the information processing apparatus 10 reflects the operation signal on processing of an application and outputs a result of the processing from the outputting apparatus 4. In the information processing system 1, the information processing apparatus 10 is a game apparatus for executing a game, and the inputting apparatus 6 is an apparatus such as a game controller which provides an operation signal of a user to the information processing apparatus 10. It is to be noted that the inputting apparatus 6 may be an input interface such as a keyboard or a mouse. A camera 7 which is an image pickup apparatus is provided in the proximity of the outputting apparatus 4 and picks up an image of a space around the outputting apparatus 4. While FIG. 1 depicts an example wherein the camera 7 is attached to an upper portion of the outputting apparatus 4, it may otherwise be disposed at a side portion or a lower portion of the outputting apparatus 4. In any case, the camera 7 is disposed at a position at which it can pick up an image of a user positioned in front of the outputting apparatus 4. The camera 7 may be a stereo camera.

The server 5 provides a network service to a user of the information processing system 1. The server 5 manages a network account for specifying each user, and each user uses its network account to sign in to a network service provided by the server 5. The user can register save data of a game or a trophy which is a virtual award article acquired during game play into the server 5 by signing in to the network service from the information processing apparatus 10.

A button configuration of the inputting apparatus 6 is described.

[Configuration of the Upper Face Portion] FIG. 2(*a*) depicts an appearance configuration of an upper face of the inputting apparatus. The user would grasp a left side grip portion 78*b* with the left hand thereof and grasp a right side grip portion 78*a* with the right hand thereof to operate the inputting apparatus 6. On an upper face of a housing of the inputting apparatus 6, a direction key 71, analog sticks 77*a* and 77*b* and four different operation buttons 76 which are inputting units are provided. The four different buttons 72 to 75 have different figures in different colors in order to allow distinction among them. In particular, on the ○ button 72, a red round mark is inscribed; on the x button 73, a blue cross mark is inscribed; on the □ button 74, a purple square mark is inscribed; and on the Δ mark 75, a green triangular mark is inscribed. A touch pad 79 is provided at a flat region between the direction key 71 and operation buttons 76 on the upper face of the housing. The touch pad 79 also functions as a press-type button which is depressed down when the user pushes and comes back to the original position when the user releases its hand.

A function button 80 is provided between the two analog sticks 77*a* and 77*b*. The function button 80 is used to switch on the power supply to the inputting apparatus 6 and simultaneously render active the communication function for connection between the inputting apparatus 6 and the information processing apparatus 10. It is to be noted that, when the main power supply to the information processing apparatus 10 is off, if the function button 80 is depressed, then the information processing apparatus 10 accepts a connection request transmitted thereto from the inputting apparatus 6 as an instruction to switch on the main power supply. Consequently, the main power supply to the information processing apparatus 10 is switched on. After the inputting apparatus 6 connects to the information processing apparatus 10, the function button 80 is used also to cause a menu screen to be displayed on the information processing apparatus 10.

A SHARE button 81 is provided between the touch pad 79 and the direction key 71. The SHARE button 81 is utilized to input an instruction from the user to the OS or system software of the information processing apparatus 10. Meanwhile, an OPTIONS button 82 is provided between the touch pad 79 and the operation buttons 76. The OPTIONS button 82 is utilized to input an instruction from the user to an application (game) executed in the information processing apparatus 10. Both of the SHARE button 81 and the OPTIONS button 82 may be formed as push-type buttons.

[Configuration of the Back Side Face Portion] FIG. 2(*b*) depicts an appearance configuration of the back side face of the inputting apparatus. On the upper side of the back side face of the housing of the inputting apparatus 6, the touch pad 79 is provided so as to extend from the upper face of the housing, and a transversely elongated light emitting section 85 is provided on the lower side of the back side face of the housing. The light emitting section 85 has red (R), green (G) and blue (B) LEDs, which are turned on in accordance with emission color information transmitted thereto from the information processing apparatus 10. Where two inputting apparatuses 6*a* and 6*b* are used as depicted in FIG. 1, the information processing apparatus 10 may determine the lighting colors of the light emitting units 85 of the inputting apparatuses 6*a* and 6*b* to different colors, to red and green, so that the users A and B can distinguish the respective inputting apparatus 6. Consequently, since each user can recognize the inputting apparatus 6 used by the user itself from the lighting color of the light emitting section 85, the possibility that the inputting apparatus 6 may be mistaken decreases.

On the housing back side face, an upper side button 83*a* and a lower side button 84*a* as well as an upper side button 83*b* and a lower side button 84*b* are provided at leftwardly and rightwardly symmetrical positions in the longitudinal direction. The upper side button 83*a* and the lower side button 84*a* are operated by the forefinger and the middle finger of the right hand of the user, respectively, and the upper side button 83*b* and the lower side button 84*b* are operated by the forefinger and the middle filter of the left hand of the user, respectively. Since the light emitting section 85 is provided between the arrangement of the upper side button 83a and the lower side button 84a on the right side and the arrangement of the upper side button 83b and the lower side button 84b on the left side as depicted in FIG. 2(b), it is not hidden by any of the fingers which operate associated buttons, and the camera 7 can suitably pick up an image of the light emitting section 85 which is in an on state. The upper side buttons 83 may be configured as push-type buttons, and the lower side buttons 84 may be configured as trigger-type buttons supported for turning motion.

FIG. 3 depicts a configuration of the inputting apparatus 6. The inputting apparatus 6 includes a wireless communication module 90, a processing section 91, the light emitting section 85, and a vibrator 98. The wireless communication module 90 has a function of transmitting and receiving data to and from a wireless communication module of the information processing apparatus 10. The processing section 91 executes an intended process of the inputting apparatus 6.

The processing section 91 has a main controlling unit 92, an input acceptance unit 93, a light emission controlling unit 94, a three-axis acceleration sensor 95, a three-axis gyro sensor 96 and a driving controlling unit 97. The main controlling unit 92 carries out transmission and reception of necessary data to and from the wireless communication module 90.

The input acceptance unit 93 accepts input information from such inputting units as the direction key 71, operation buttons 76, analog sticks 77, touch pad 79, function button 80, SHARE button 81, OPTION button 82, upper side buttons 83 and lower side buttons 84 and sends the input information to the main controlling unit 92. The main controlling unit 92 converts the received input information into a predetermined control signal as occasion demands and supplies the control signal to the wireless communication module 90. Thus, the wireless communication module 90 sends the control signal to the information processing apparatus 10 at a predetermined timing. The light emission controlling unit 94 controls emission of light from a red LED 87, a green LED 88 and a blue LED 89 which configure the light emitting section 85.

In the information processing system 1 of the present embodiment, if the user depresses the function button 80 while the inputting apparatus 6 is in a power-off state, then the power supply to the inputting apparatus 6 is turned on and the main controlling unit 92 generates a connection request to the information processing apparatus 10. The wireless communication module 90 transmits the connection request to the information processing apparatus 10. At this time, even if the information processing apparatus 10 is in a main power supply off state, since the wireless communication module in the information processing apparatus 10 is in an active state even in the main power supply off state, the information processing apparatus 10 turns on the main power supply in response to reception of the connection request thereby to start up the OS (system software) to establish wireless connection to the inputting apparatus 6.

The system software of the information processing apparatus 10 determines a lighting color of the light emitting section 85 of the inputting apparatus 6 from which the connection request has been received and transmits the lighting color information to the inputting apparatus 6. At this time, the system software preferably analyzes the color information included in the space whose image is picked up by the camera 7 and specifies colors which are not included in environment colors as far as possible to determine a lighting color of the light emitting section 85. This makes it possible to suitably detect the light emitting section 85 which is to be turned on with the designated light color from the picked up image of the camera 7 after the light emitting section 85 is turned on.

The lighting color information received by the wireless communication module 90 is passed to the main controlling unit 92, and the main controlling unit 92 notifies the light emission controlling unit 94 of the lighting color information. Consequently, the light emission controlling unit 94 can control the light emitting section 85 to emit light with the designated lighting color.

The vibrator 98 is configured including an eccentric motor and so forth and is driven by the driving controlling unit 97. The three-axis acceleration sensor 95 detects acceleration components in the three-axis directions of the XYZ directions of the inputting apparatus 6, and the three-axis gyro sensor 96 detects angular velocities in an XZ plane, a ZY plane and a YX plane.

Figure 4:
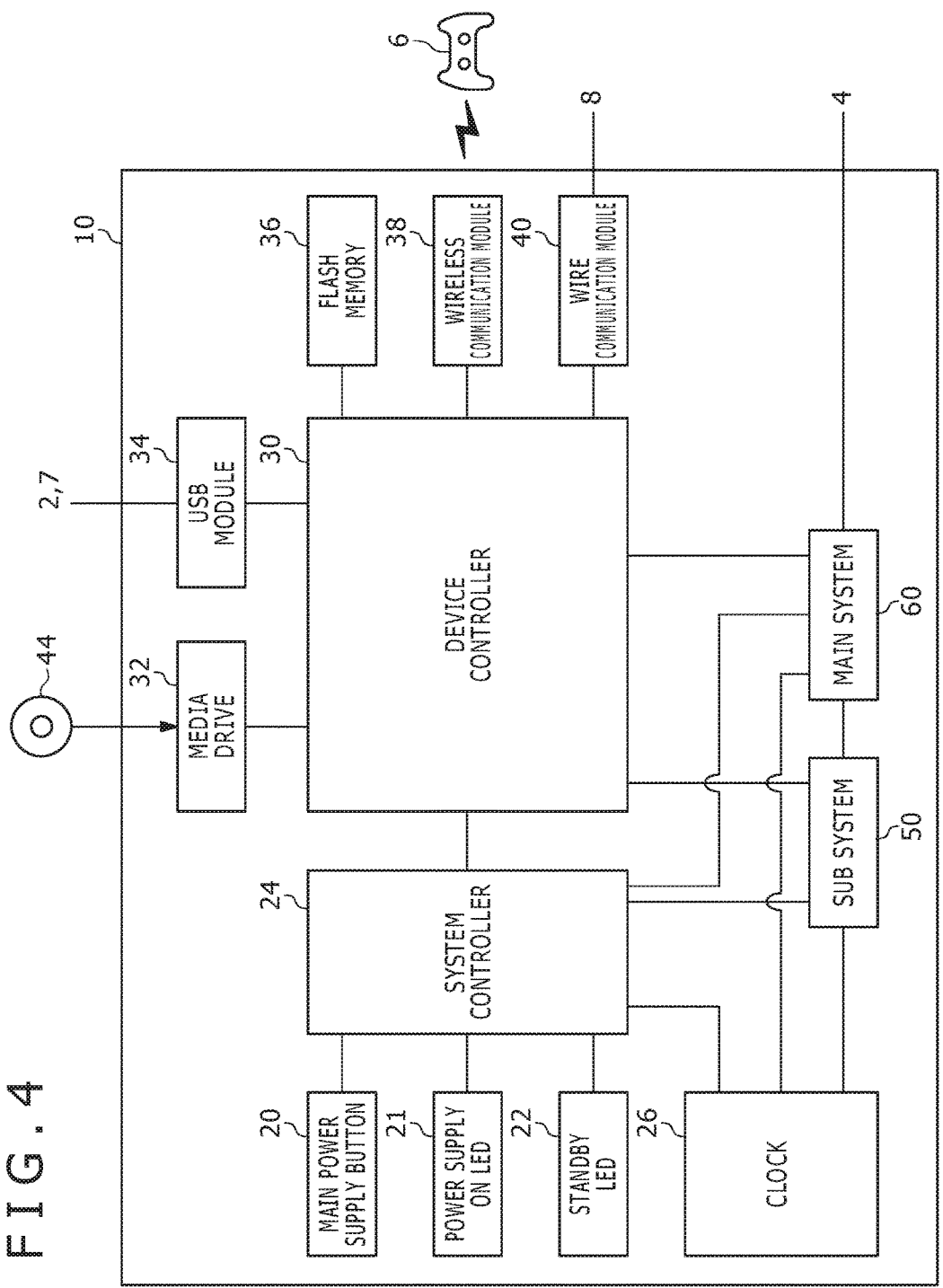
FIG. 4 is a view depicting functional blocks of an information processing apparatus.

FIG. 4 depicts a functional block diagram of the information processing apparatus 10. The information processing apparatus 10 is configured from a main power supply button 20, a power supply ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 includes a main CPU (Central Processing Unit), a memory and a memory controller which are main storage apparatuses, a GPU (Graphics Processing Unit) and so forth. The GPU is utilized principally for arithmetic operation processing of a game program. The functions mentioned are configured as a system-on-chip on a single chip. The main CPU starts up the OS and has a function of executing an application installed in the auxiliary storage apparatus 2 under an environment provided by the OS.

The sub system 50 includes a sub CPU, a memory and a memory controller which are main storage apparatuses, and so forth, but does not include a GPU. The number of circuit gates of the sub CPU is smaller than that of the main CPU, and the operation power consumption of the sub CPU is lower than that of the main CPU. The sub CPU operates while the main CPU is in a standby state as described hereinabove, and the processing functions of the sub CPU are restricted in order to suppress the power consumption low. It is to be noted that the sub CPU and the memory may be formed on different chips from each other.

The main power supply button 20 is an inputting unit to which operation inputting is carried out by the user and is provided on a front face of the housing of the information processing apparatus 10. The main power supply button 20 is operated to turn on or off the power supply to the main system 60 of the information processing apparatus 10. In the following description, that the main power supply is in an on state signifies that the main system 60 is in an active state, and that the main power supply is in an off state signifies that the main system 60 is in a standby state. The power supply ON LED 21 is turned on when the main power supply button 20 is turned on, and the standby LED 22 is turned on when the main power supply button 20 is turned off.

The system controller 24 detects depression of the main power supply button 20 by the user. If the main power supply button 20 is depressed when the main power supply is in an off state, then the system controller 24 acquires the depression operation as an "on instruction." However, if the main power supply button 20 is depressed when the main power supply is in an on state, then the system controller 24 acquires the depression operation as an "off instruction."

The main CPU has a function of executing a game program installed in the auxiliary storage apparatus 2 or a ROM medium 44 while the sub CPU does not have such a function as just described. However, the sub CPU has a function of accessing the auxiliary storage apparatus 2 and a function of transmitting and receiving data to and from the server 5. The sub CPU is configured so as to have only such restricted processing functions and therefore can operate with low power consumption in comparison with the main CPU. The functions of the sub CPU are executed while the main CPU is in a standby state. Since the sub system 50 is operative when the main system 60 is in a standby state, the information processing apparatus 10 normally maintains a sign-in state in the network service provided by the server 5.

The clock 26 is a real time clock and generates and supplies date and time information at present to the system controller 24, sub system 50 and main system 60.

The device controller 30 is configured as an LSI (Large-Scale Integrated Circuit) which executes transfer of information between devices like a south bridge. As depicted in FIG. 4, to the device controller 30, such devices as system controller 24, media drive 32, USB module 34, flash memory 36, wireless communication module 38, wire communication module 40, sub system 50 and main system 60 are connected. The device controller 30 absorbs differences in electric characteristics of and differences in data transfer speed between the devices to control timings of data transfer.

The media drive 32 is a drive apparatus which drives, when a ROM medium 44 in which application software of a game and so forth and license information are recorded is loaded in the media drive 32, the ROM medium 44 and reads out a program, data and so forth from the ROM medium 44. The ROM medium 44 is a read-only recording medium such as an optical disk, a magneto-optical disk or a Blu-ray disk.

The USB module 34 is a module which connects to an external apparatus by a USB cable. The USB module 34 may be connected to the auxiliary storage apparatus 2 and the camera 7 by a USB cable. The flash memory 36 is an auxiliary storage device which configures an internal storage. The wireless communication module 38 communicates by wireless communication, for example, with the inputting apparatus 6 by a communication protocol such as the Bluetooth (registered trademark) protocol or the IEEE802.11 protocol. It is to be noted that the wireless communication module 38 may be compatible with a third generation digital portable telephone system in compliance with the IMP-2000 (International Mobile Telecommunication 2000) prescribed by the ITU (International Telecommunication Union). Alternatively, the wireless communication module 38 may be compatible with a digital portable telephone system of a further different generation. The wire communication module 40 communicates by wireless communication with an external apparatus and connects to the network 3, for example, through the access point 8.

The information processing apparatus 10 of the present embodiment is prepared for a plurality of kinds of login processes. If a login request is received from a user, then the information processing apparatus 10 determines one login process to be executed in response to a situation of the user, an operation situation in which the login request is generated and so forth. Then, the information processing apparatus 10 provides a user interface for the determined login process to the user. In the following, an outline of the three different login processes is described.

<Login Process 1>

The login process 1 is a process for causing the information processing apparatus 10 to display a user selection screen image on the outputting apparatus 4 and carry out, when the user selects an icon of the user itself on the user selection screen image using the inputting apparatus 6 and inputs a login pass code, user authentication to allow login of the user. The login process 1 is a login process of a conventional type which utilizes a pass code.

<Login Process 2>

The login process 2 is a process for causing the information processing apparatus 10 to carry out face authentication of a user utilizing a picked up image of the camera 7, designate, when the detected face image is the face of a registered user, a position to which the inputting apparatus 6 is to be moved within the camera image reflected on the display unit to the registered user and carry out, when the user moves the inputting apparatus 6 to the designated region, user authentication to allow the user to log in.

<Login Process 3>

The login process 3 is a process for causing the information processing apparatus 10 to carry out face authentication of a user utilizing a picked up image of the camera 7, designate, when it is decided that the detected face image is the face of a registered user, a position to which the face is to be moved in the camera image reflected on the display unit to the registered user and carry out, when the user moves the face into the designated region, user authentication to allow the user to log in.

The login processes 1 and 2 are common in that the user authentication is carried out utilizing the inputting apparatus 6. However, they are different from each other in that, while, in the login process 1, the user authentication is carried out by the user inputting a pass code, in the login process 2, the user authentication is carried out only by moving the inputting apparatus 6 into a predetermined region.

The login process 1 is executed in a case where a user transmits a login request from the inputting apparatus 6 to the information processing apparatus 10 and a face image of the user is not registered in the information processing apparatus 10. Meanwhile, the login process 2 is executed in another case where a user transmits a login request from the inputting apparatus 6 to the information processing apparatus 10 and a face image of the user is registered in the information processing apparatus 10. If the login processes 1 and 2 are compared with each other, then it can be considered that, since the login process 2 does not require inputting of a pass code, it is a login operation which is simple and easy for the user.

The login processes 2 and 3 are common in that face authentication is carried out utilizing a picked up image of the camera 7. However, they are different from each other in that, while, in the login process 2, a movement of the inputting apparatus 6 into a predetermined region is detected to carry out the user authentication, in the login process 3, a movement of the face of a user into a predetermined region is detected to carry out the user authentication.

When a game is played, a user generally operates the inputting apparatus 6. However, in recent years, also a game which reflects a movement of a user on a movement of a game character has appeared. In a game which utilizes a gesture of a user, since the user does not use the inputting apparatus 6, also when the user is to log in to the OS of the information processing apparatus 10, preferably the user authentication is carried out without using the inputting apparatus 6.

Therefore, the login process 3 is executed not when a user transmits a login request from the inputting apparatus 6 to the information processing apparatus 10 but when a user depresses the main power supply button 20, for example, in a state in which the information processing apparatus 10 is in a power-off state.

In this manner, the information processing apparatus 10 determines which one of the login processes 1 to 3 is to be executed depending upon whether or not a user has a face image registration and whether or not a user transmits a login request from the inputting apparatus 6.

Figure 5:
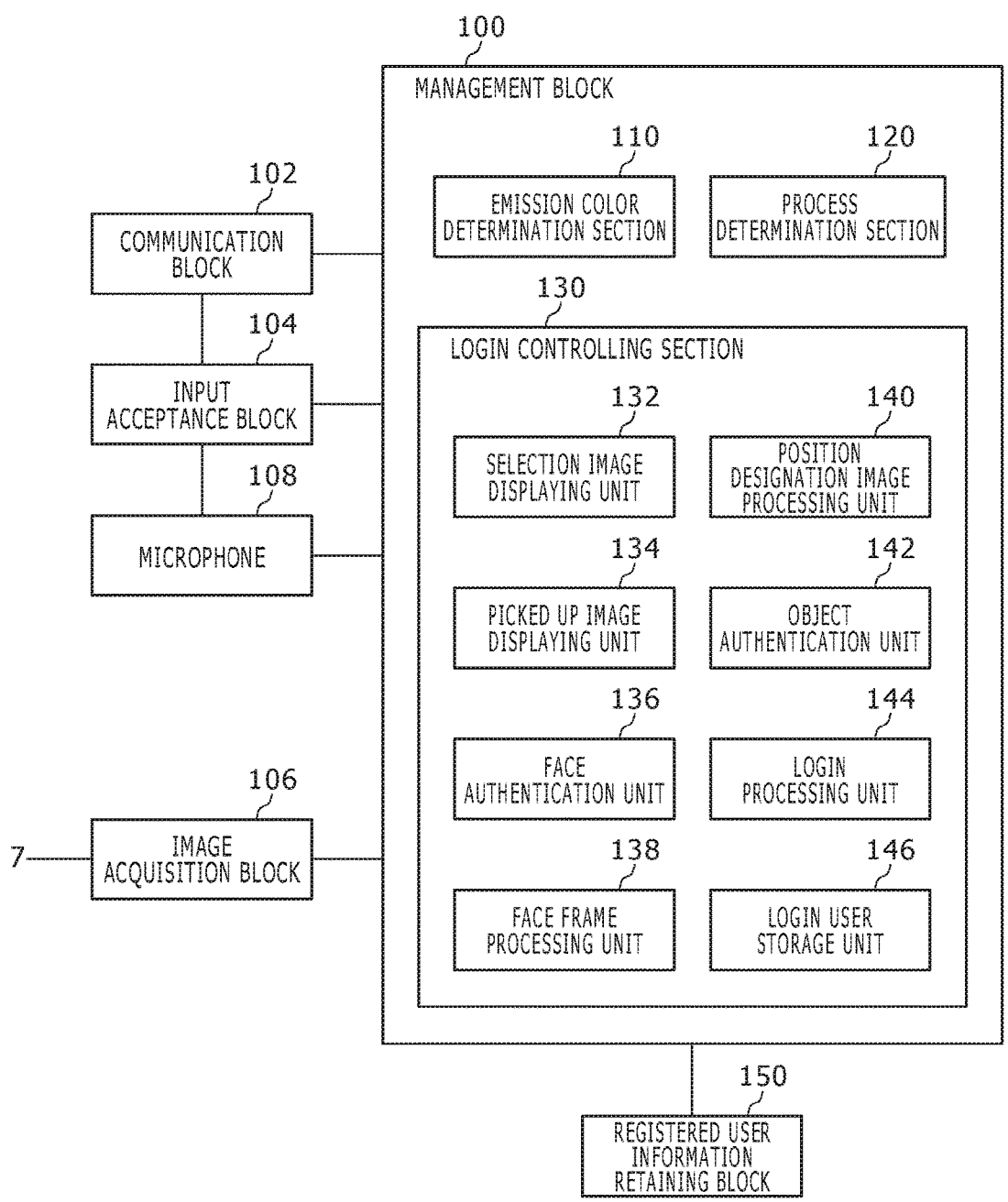
FIG. 5 is a view depicting a configuration of the information processing apparatus.

FIG. 5 depicts a configuration of the information processing apparatus 10. The information processing apparatus 10 includes a communication block 102, an input acceptance block 104, an image acquisition block 106, a microphone 108, a management block 100 and a registered user information retaining block 150. Functions of the management block 100 are implemented by the OS (system software) of the information processing apparatus 10, an application executed by the OS and a memory, and the management block 100 includes an emission color determination section 110, a process determination section 120 and a login controlling section 130. The login controlling section 130 includes a selection image displaying unit 132, a picked up image displaying unit 134, a face authentication unit 136, a face frame processing unit 138, a position designation image processing unit 140, an object authentication unit 142, a login processing unit 144 and a login user storage unit 146. The communication block 102 demonstrates the functions of the wireless communication module 38 and the wire communication module 40 depicted in FIG. 4.

Referring to FIG. 5, the components described as functional blocks which carry out various processes can be configured, in hardware, from circuit blocks, a memory and other LSIs, and in software, from a program or the like loaded in the memory. Accordingly, it can be recognized by those skilled in the art that the functional blocks can be implemented in various forms only from hardware, only from software or from a combination of hardware and software and are not limited to any one of them.

The information processing apparatus 10 of the present embodiment has a characteristic in that it supports preferred login operation of a user. In order to log in to the OS of the information processing apparatus 10, as a premise therefor, it is necessary for the user to acquire a user account in advance and register various user information in the information processing apparatus 10. In the following, a user whose user account is registered in the information processing apparatus 10 is referred to as "registered user."

The registered user information retaining block 150 retains various information relating to a registered user. In particular, the registered user information retaining block 150 retains, as registered user information, a login pass code, a sign-in ID for signing in to the server 5, a network account, an online ID (nick name on the network) of the user, a user icon for representing the user and so forth in an associated relationship with the user account. It is to be noted that, as regards a registered user whose face image is registered in advance for a face authentication process, the registered user information retaining block 150 retains the face identification data as registered user information in an associated relationship with the user account.

Here, while the face identification data is characteristic amount data of a face image of the registered user, the face identification data may be face image data itself. The face identification data is data which makes a comparison target in a face authentication process by the face authentication unit 136 and is generated in accordance with a face authentication algorithm adopted by the face authentication unit 136. For example, the face authentication data may be data representative of relative positions and sizes of parts of the face, shapes of the eyes, nose, cheekbones or chin and so forth extracted as characteristics. Alternatively, the face identification data may be data extracted as difference data from standard data of a face image. Which face identification data is to be extracted depends upon an adopted face recognition algorithm. In the present embodiment, a face recognition algorithm known to the face authentication unit 136 is adopted. It is to be noted that, as regards a registered user whose face image is not registered, naturally the face identification data is not included in the registered user information retaining block 150.

In the following description, it is assumed that registered user information at least of the users A and B is stored in the registered user information retaining block 150 and the online ID of the user A is "HANAKO" and the online ID of the user B is "SACHIKO." In the following, a detailed process when a registered user logs in to the OS of the information processing apparatus 10 is described.

<Login Process 1>

If a user depresses the function button 80 of the inputting apparatus 6, then the depression information is transmitted to the information processing apparatus 10. In the information processing apparatus 10, the communication block 102 accepts the depression information as a connection request and establishes a connection between the inputting apparatus 6 and the communication block 102. It is to be noted that, if the main power supply to the information processing apparatus 10 is off, then the communication block 102 establishes a connection to the inputting apparatus 6 after the main power supply to the information processing apparatus 10 is turned on in response to the depression information of the function button 80. Further, the depression information of the function button 80 is transmitted to the input acceptance block 104. The input acceptance block 104 thus accepts the depression information as a login request from the user and conveys the login request to the management block 100.

First, the emission color determination section 110 determines a lighting color of the light emitting section 85 of the inputting apparatus 6 from which the login request has been transmitted. The image acquisition block 106 acquires picked up image data from the camera 7. For example, the camera 7 picks up an image of the space periodically (for example, every 1/30 seconds) and supplies the picked up image to the image acquisition block 106 through the USB module 34. The emission color determination section 110 determines a lighting color in accordance with a predetermined allocation order. At this time, if the lighting color determined in accordance with the allocation order exists in the image pickup space, then the emission color determination section 110 may specify colors which do not exist in the image pickup space from within the picked up image and determine a lighting color from among the specified colors. After the emission color determination section 110 determines a lighting color, the communication block 102 transmits the lighting color information to the inputting apparatus 6. In the inputting apparatus 6, the wireless communication module 90 receives the lighting color information, and the light emission controlling unit 94 turns on the light emitting section 85 with the lighting color represented by the lighting color information. For example, if the lighting color information designates red, then the light emitting section 85 of the inputting apparatus 6 is turned on in red.

Meanwhile, the selection image displaying unit 132 reads out registered user information retained in the registered user information retaining block 150 and generates a selection image for selecting a user registered in the information processing apparatus 10. In particular, the selection image displaying unit 132 reads out user icons and online IDs from within the registered user information and displays a user selection screen image, in which the online IDs of the registered users are juxtaposed in the form of a list, on the outputting apparatus 4. This selection screen image configures a login screen image in the login process 1. However, as hereinafter described, upon initial displaying of a selection screen image, a determination process regarding whether or not the login process 2 is to be executed has been carried out, and after it is determined that the login process 2 is not to be executed, the user selection screen image formally configures a login screen image in the login process 1.

FIG. 6(a) depicts an example of the user selection screen image. The selection image displaying unit 132 reads out user icons and online IDs of all registered users retained in the registered user information retaining block 150 and displays the read out user icons and online IDs in the form of a list so as to allow selection by a user. In the following, a user icon and an online ID are referred to as "user specification information."

The picked up image displaying unit 134 displays a picked up image acquired by the image acquisition block 106 in a small window region 202 at part of the user selection screen image. This display image is a live image of the camera 7, and a message: "A registered face is being sought" is displayed in the proximity of the small window region 202. This message is displayed during a face authentication process by the face authentication unit 136. Accordingly, when the face authentication process comes to an end, the message display is erased. In particular, in the state depicted in FIG. 6(a), while the user selection screen image is displayed, it can be confirmed by the face authentication unit 136 whether or not a user whose face image is registered exists in the picked up image on the background of the user selection screen image.

Figure 7:
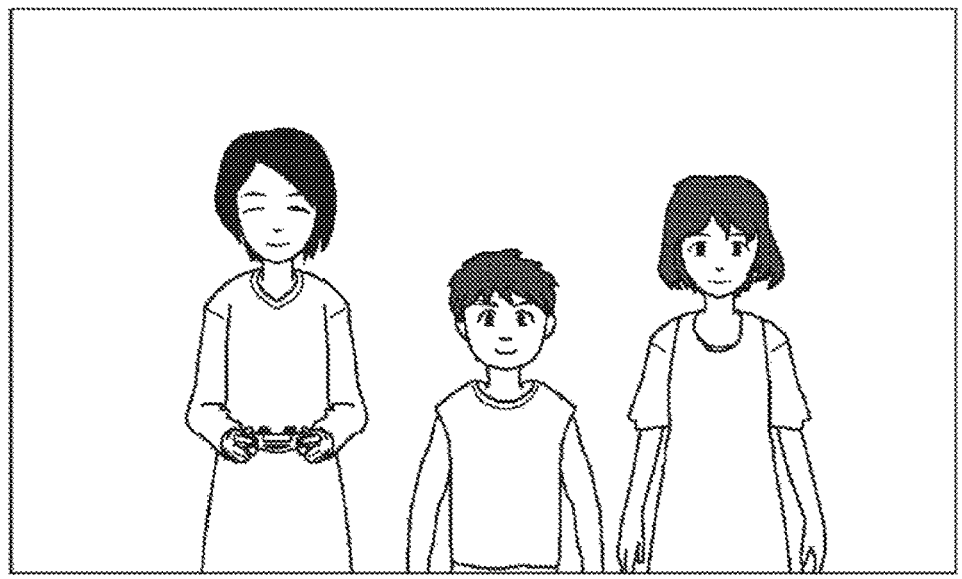
FIG. 7 is a view depicting an example of a space whose image is picked up a camera.

FIG. 7 depicts an example of a space whose image is picked up by the camera 7. In this image pickup space, three users exist. In FIG. 7, a quadrangular frame surrounding the three users represents an image pickup range of the camera 7. Although the image pickup range of the camera 7 defines a range displayed as a live image on the outputting apparatus 4, the live image may be part of the picked up image. The face authentication unit 136 extracts a portion of the picked up image estimated as the face of a person, derives characteristic amount data of the portion, and compares the characteristic amount data with the face identification data retained in the registered user information retaining block 150 to decide whether or not the extracted face is the face of a registered user.

In particular, the face authentication unit 136 derives the degree of coincidence between the characteristic amount data of the face image of the extracted user and the face identification data of all registered users retained in the registered user information retaining block 150. This degree of coincidence is represented by a numerical value and is derived in such a form of, for example, what point from 100 points in the perfect score. If the degree of coincidence with characteristic amount data of a registered face image exceeds 90 points, then the face authentication unit 136 decides that the user of the picked up image is a registered user and specifies which registered user the user of the picked up image is. It is to be noted that a plurality of pieces of characteristic amount data indicate a score exceeding 90 points, the face authentication unit 136 may determine that the user of the picked up image is a registered user of the face identification data from which the highest score is derived. It is to be noted that, when the degree of coincidence between the characteristic amount data of the face image of the user extracted from the picked up image and the face recognition data of all registered users is derived, if the degree of coincidence of none of the face recognition data exceeds 90 points, then the face authentication unit 136 decides that the user included in the picked up image is not any registered user. In this manner, the face authentication unit 136 uses the face identification data retained in the registered user information retaining block 150 to detect face images of all registered users existing in the picked up image. As this face identification technology, a known technology may be used.

If it is determined by the face authentication unit 136 that all of the three users included in the picked up images are not registered users, then the login processing unit 144 erases the display of the message having been displayed as "A registered face is being sought" and may erase also the display of the small window region 202. It is to be noted that, also when all of the users determined to be registered users by the face authentication unit 136 are logged in already, the login processing unit 144 may erase the display of the message displayed as "A registered face is being sought" and may erase also the display of the small window region 202. In this manner, when a login request is generated by operation of the inputting apparatus 6, the face authentication unit 136 determines whether or not a user who does not log in as yet but has a face image registered already is included in a picked up image by the camera 7. Then, when it is found that the picked up image does not include a user whose face image is registered, the selection image displaying unit 132 continues display of the user selection screen image, and the login processing unit 144 starts the login process 1. The determination time period by the face authentication unit 136 is several seconds, and accordingly, the small window region 202 and the message continue to be displayed for several seconds on the user selection screen image.

In the login process 1, the login processing unit 144 displays, on the user selection screen image, a focus frame 200, which surrounds one piece of user specification information, for movement on the list. The user can select the own user specification information by operating the inputting unit of the inputting apparatus 6 to move the focus frame 200 to a display region of the user specification information of the user itself and then depressing the determination button (o button 72) of the inputting apparatus 6. On the user selection screen image, the number of pieces of user specification information to be displayed is limited and, in the example depicted in FIG. 6(a), limited to four in the maximum. Where the number of registered users exceeds four, the user can scroll the list of the user specification information leftwardly or rightwardly by operating the inputting unit of the inputting apparatus 6.

Here, if it is assumed that the user who requests login is the user A and the user A operates the inputting apparatus 6a to select "HANAKO" on the selection screen image, then the login processing unit 144 displays an inputting screen image for a pass code depicted in FIG. 6(b) on the outputting apparatus 4. Here, if the user A inputs its registered pass code, then the login processing unit 144 determines whether the inputted passcode is same as the login pass code of the user A retained in the registered user information retaining block 150 to determine whether or not login of the user A is to be permitted. In this series of login operation, the login processing unit 144 accepts only operation information from the inputting apparatus 6a but does not accept operation information from any other inputting apparatus 6 than the inputting apparatus 6a. The login controlling section 130 executes the login process 1 of a user in this manner.

If a registered user who does not log in as yet is not detected by the face authentication unit 136 in this manner, then the login controlling section 130 executes the login process 1 so that a user whose face image is not registered as yet can log in smoothly.

<Login Process 2>

As described above, when the user operates the inputting apparatus 6 to generate a login request, if the face authentication unit 136 determines that a user whose face image is registered does not exist in a picked up image, then the login process 1 is executed. Meanwhile, when the user operates the inputting apparatus 6 to generate a login request, if the face authentication unit 136 determines that a picked up image includes a user who does not log in as yet but has a face image thereof registered, then the login process 2 is executed.

Figure 8:
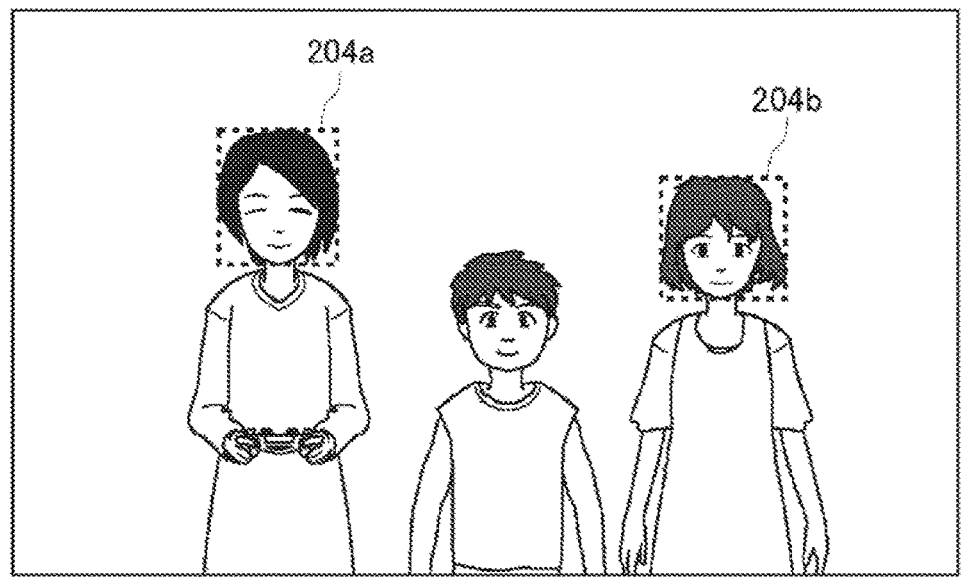
FIG. 8 is a view depicting a face identification result by a face authentication unit.

FIG. 8 depicts a face identification result by the face authentication unit 136. Here, it is determined that the left side user is the user A; the right side user is the user B; and the middle user is not a registered user whose face image is registered. The face authentication unit 136 sets a face region 204a indicative of the position of the face of the user A (online ID: HANAKO) in the picked up image and another face region 204b indicative of the position of the face of the user B (online ID: SACHIKO) in the picked up image. Then, the face authentication unit 136 provides position coordinates of the face regions 204a and 204b and information for specifying the registered users of the picked up image to the face frame processing unit 138. In the following, an example is described wherein the position coordinates are presented by coordinates of a two-dimensional coordinate system when the picked up image is displayed on the display unit. However, the position coordinates may be coordinates defined on a VRAM. In any case, only it is necessary for coordinates of a face region 204 and coordinates of a face frame hereinafter described to be represented on a common coordinate system.

Each face region 204 may be set as a rectangular region contiguous to the profile of a face in a picked up image. However, the face region 204 may be set as a rectangular region a little greater than the face profile. It is to be noted that, although the profile of the face here signifies a profile including the hair, for example, where the face recognition process of the face authentication unit 136 does not take the hair into consideration, a profile of a face may be set excluding the hair. The size and the shape of the face region 204 depends upon the size and the shape of the face of a user in a picked up image, and accordingly, the size and the shape of the face region 204 differ for each user. Alternatively, even with the same user, the size and the shape of the face region 204 vary in response to the distance to the camera 7.

Information for specifying a registered user provided from the face authentication unit 136 to the face frame processing unit 138 may be a user account of the registered user or may be an online ID. The face authentication unit 136 provides position information of the face region 204 and registered user specification information in an associated relationship with each other into the face frame processing unit 138. In particular, in the example depicted in FIG. 8, the face authentication unit 136 provides a combination of the face region 204a and the specification information of the user A and a combination of the face region 204b and the specification information of the user B to the face frame processing unit 138. The face frame processing unit 138 displays a face frame for a registered user detected by the face authentication unit 136 on the outputting apparatus 4.

FIG. 9 depicts a login screen image in the login process 2. The login screen image depicted in FIG. 9 is displayed on the outputting apparatus 4 after a user whose face image is registered in a picked up image by the face authentication unit 136 while the user selection screen image depicted in FIG. 6 is displayed and a user selection screen image is placed into a non-displayed state.

On the login screen image in the login process 2, the picked up image displaying unit 134 live displays a picked up image of the camera 7 in a picked up image displaying region 206. The face frame processing unit 138 displays a face frame 210 for a registered user on the basis of the position coordinates of each of the face regions 204a and 204b and the information for specifying a registered user of the picked up image provided from the face authentication unit 136. Here, a face frame 210a is displayed for the user A and another face frame 210b is displayed for the user B. At this time, the face frame processing unit 138 displays the online ID (HANAKO) of the user A in the proximity of the face frame 210 and displays the online ID (SACHIKO) of the user B in the proximity of the face frame 210b. Consequently, the users A and B can know that the face recognition of the users themselves is performed. If an online ID different from that of a user itself is displayed in the proximity of the face frame 210 of the user itself, then the user can know that the face recognition is not carried out appropriately. It is to be noted that, since the middle user is not a registered user whose face image is registered, the face frame 210 is not displayed therefor.

The position designation image processing unit 140 displays, for a registered user detected by the face authentication unit 136, a position designation image 212 for designating the position of an object on the outputting apparatus 4 that is a display unit. Here, the object is the inputting apparatus 6 that is a game controller, and the position designation image 212 designates a position in a picked up image displayed on the picked up image displaying region 206 to which the user moves the inputting apparatus 6 to pick up an image. In the login process 2, the position designation image 212 is displayed in order to allow a registered user to move and dispose the inputting apparatus 6 when the registered user is to log in.

The position designation image processing unit 140 displays the position designation image 212 for each of the registered users on the basis of position coordinates of the face regions 204a and 204b provided by the face authentication unit 136. Here, the position designation image 212a is displayed for the user A, and the position designation image 212b is displayed for the user B. The position designation image processing unit 140 applies an ID to each of the position designation images 212 and provides the position designation image IDs and specification information of the corresponding users to the login processing unit 144. For example the position designation image processing unit 140 sets the designated position image ID of the position designation image 212a as "ID1" and the designated position image ID of the position designation image 212b as "ID2," and provides a combination of "ID1" and the specification information of the user A and another combination of "ID2" and the specification information of the user B to the login processing unit 144. Accordingly, here, the position designation image processing unit 140 provides the combination of "ID1" and the specification information of the user A and the combination of "ID2" and the specification information of the user B to the login processing unit 144.

The position designation image processing unit 140 preferably displays, to a user who tries to log in, such a position designation image 212 that operation to be carried out from now can be recognized. In the present example, the position designation image 212 is an image which includes an image of the game controller and besides in which an LED of the game controller emits light of red. Consequently, a user who tries to log in can recognize readily that it is only necessary for the user to move the inputting apparatus 6, on which the light emitting section 85 emits red light, to a region designated by the position designation image 212 such that the camera 7 picks up an image.

In the login process 2, since the inputting apparatus 6 requests the user to move the inputting apparatus 6 to a region designated by the position designation image 212, the region to be designated by the position designation image 212 is preferably set to a position to which the user can move the inputting apparatus 6 readily. Therefore, the position designation image processing unit 140 displays the position designation image 212 which designates a position on the lower side of the face image of the registered user, namely, a position on the lower side of the face frame 210.

FIG. 10 depicts a login image after the user moves the inputting apparatus 6 to a position designated by the position designation image 212. Here, the inputting apparatus 6 is depicted in an upwardly lifted state by the user A such that the inputting apparatus 6 may overlap with the game controller image included in the position designation image 212a displayed on the outputting apparatus 4. The object authentication unit 142 monitors whether an image of the inputting apparatus 6 is included in the designated region of the picked up image designated by the position designation image 212a. It is to be noted that, although the position to which the user is to move the inputting apparatus 6 is designated to the user by a game controller image included in the position designation image 212a, the object authentication unit 142 preferably monitors the image of the inputting apparatus 6 in a region including not only the game controller image but also a region in the proximity of the game controller image. For example, the region to be monitored by the object authentication unit 142 is preferably set to a region within a predetermined radius from the center of the game controller image included in the position designation image 212 so that, even if the inputting apparatus 6 cannot be adjusted fully to the game controller image, the object authentication unit 142 can detect that the image of the inputting apparatus 6 is included in the region designated by the position designation image 212. The designated region may have a rectangular shape or some other shape.

It is to be noted that, in FIG. 10, the position designation image processing unit 140 displays the position designation images 212a and 212b for the users A and B, respectively, and accordingly, the object authentication unit 142 monitors whether an image of the inputting apparatus 6 is included in each of the regions designated by the position designation images 212a and 212b. In the present example, since a login process of the inputting apparatus 6 in which the light emitting section 85 is lit in red is performed, the position designation image processing unit 140 may display each of the game controller images lit in red as the position designation images 212a and 212b, such that the object authentication unit 142 determines whether or not a red rectangular region exists in each of the designated regions to detect the presence of the inputting apparatus 6. If the object authentication unit 142 detects presence of the inputting apparatus 6 in any of the designated regions, then the object authentication unit 142 notifies the login processing unit 144 of the information (position designation image ID) for specifying the position designation image 212 on which the inputting apparatus 6 having the light emitting section 85 lit in red is detected.

As described hereinabove, the login processing unit 144 is notified of the combination of the position designation image ID and the specification information of the user from the position designation image processing unit 140. When the login processing unit 144 is notified of the position designation image ID from the object authentication unit 142, the login processing unit 144 can acquire the specification information of the user from the combination information received in advance. Accordingly, the login processing unit 144 recognizes that an inputting apparatus 6 lit in red is detected in the region designated by the position designation image 212a displayed for the user A. Consequently, the login processing unit 144 allows the user A to log in to the information processing apparatus 10. The login processing unit 144 stores the login information, namely, the information for specifying the user A (user account), the information for designating the inputting apparatus 6a used by the user A (game controller ID) and the information for identifying the inputting apparatus 6a included in the picked up image (red light emission information) in an associated relationship with each other into the login user storage unit 146.

As described above, in the login process 2, the face authentication unit 136 first carries out face authentication and then the object authentication unit 142 detects that the inputting apparatus 6 is included in a designated region, and the login processing unit 144 thereby allows a registered user to log in. For example, in the face authentication process, after the face of a person is detected in a first picked up image and determination of whether or not the person is a registered user is carried out, the face authentication process may not be carried out until an image of a new user is picked up. It is to be noted that, in this case, the detected face of the person is tracking-processed in picked up images and normally provides position coordinates of the face image in the picked up images to the face frame processing unit 138 and the position designation image processing unit 140. Consequently, the face frame 210 and the position designation image 212 are displayed following the movement of the face of the user in the picked up image displaying region 206. It is to be noted that the face authentication may be executed in a predetermined period and, within a time zone within which the face authentication is not carried out, the face of the detected person may be tracking-processed.

The face frame processing unit 138 and the position designation image processing unit 140 do not display, for a user who logs in already, the face frame 210 and the position designation image 212. If the face authentication unit 136 detects that a registered user is included in the picked up image, then the face frame processing unit 138 and the position designation image processing unit 140 refer to the login user storage unit 146 to determine whether or not the detected registered user has logged in already. For example, if the user B (online ID: SACHIKO) on the right side in the screen image is a user logged in already, then the face frame processing unit 138 and the position designation image processing unit 140 do not display the face frame 210b and the position designation image 212b.

In the following, a display mode of the face frame 210 and the position designation image 212 is described. It is to be noted that, in FIGS. 11 to 15, display of the other body portions than the face of the registered users and the other users included in a picked up image is omitted for the convenience of illustration.

The face frame processing unit 138 displays the face frames 210 for the registered users on the basis of the position coordinates of the face regions 204a and 204b provided from the face authentication unit 136 and the information for specifying the registered users of the picked up image. The position coordinates of each face region 204 provided from the face authentication unit 136 may be, for example, coordinate values of four vertices of the face region 204 set as a rectangle. The position designation image processing unit 140 displays a position designation image 212 which designates a position on the lower side of a face image of the registered user.

Each user sometimes moves within an image pickup region after the face frame 210 and the position designation image 212 are displayed. As described above, the face frame 210 and the position designation image 212 are preferably displayed in the picked up image displaying region 206 so as to follow up the movement of the user.

FIG. 11 depicts an example of a login screen image. On this login screen image, the face authentication unit 136 is placed into a state in which it cannot detect the user B within a picked up image and no more can set the face region 204b. Since failure to detect the user B sometimes depends upon the accuracy in face identification by the face authentication unit 136, even if the face authentication unit 136 fails to detect the user B, this does not necessarily mean that the user B has gone out of the frame of the camera 7. Therefore, even if a state in which the user B is not detected by the face authentication unit 136 is entered, the face frame processing unit 138 continues to display the face frame 210b displayed once under a predetermined condition. Consequently, in such a case that success in detection and failure in detection of the user B by the face authentication unit 136 are repeated alternately, such a situation that display and non-display of the face frame 210b are repeated alternately can be avoided. It is to be noted that the face frame processing unit 138 is notified from the face authentication unit 136 that the user B is not detected, then it may make the display mode of the face frame 210b different from that of the face frame 210a. For example, the face frame 210b may be displayed so as to blink. The position designation image processing unit 140 continues to display the position designation image 212b below the face frame 210b as long as the face frame 210b is displayed.

In the foregoing description of the example, it is described that, even if the user B is not detected, the face frame 210b continues to be displayed under a predetermined condition. A reference for configuring the predetermined condition is described below.

First, as a premise, the face frame processing unit 138 limits the number of face frames 210 to be displayed to a predetermined number when a plurality of face frames 210 are displayed for different registered users. This is because it is difficult to display a large number of face frames 210 of the output apparatus 4. Therefore, the face frame processing unit 138 sets the upper limit to the number of face frames 210 to be displayed, for example, to four such that, even if five or more registered users are detected in a picked up image by the face authentication unit 136, face frames 210 for four registered users are displayed.

At this time, although it is necessary for the face frame processing unit 138 to determine for which users the face frames 210 are to be displayed, in order to determine a reference for the determination, a priority order for display of face frames 210 is determined for a plurality of registered users in a picked up image. The priority order is determined in the following manner.

(a) First, an order of registered users to be included in an initial login screen image is determined. Here, if it is assumed that the users A and B are included in the initial login screen image, then the face frame processing unit 138 may determine such that one of the users A and B whose number of times of login is greater has the first rank while the other user whose number of times of login is smaller has the second rank. For example, if the number of times of login of the user B is greater, then the order is determined such that the user B has the first rank and the user A has the second rank. It is to be noted that the face frame processing unit 138 may otherwise determine such that the user having a greater face region 204 has a higher priority rank. The face frame processing unit 138 may compare the areas of a plurality of face regions 204 set by the face authentication unit 136 with each other and determine such that the user having a greater face region 204 has a higher priority rank. It is to be noted that, where the camera 7 is a stereo camera, since the distance between each user and the camera 7 can be measured, the face frame processing unit 138 may determine such that the user spaced by a smaller distance from the camera 7 has a higher priority rank.

(b) Then, the rank of a registered user who comes to be included into a login screen image after the initial login screen image depicted in FIG. 9 is displayed is determined so as to be a higher rank. In particular, the face frame processing unit 138 determines the rank of a registered user whose image is picked up newly by the camera 7 so as to be the first rank and lowers the rank of the registered user or users whose image has been picked up already by one rank. Accordingly, if an image of the user C is picked up newly by the camera 7, then the user C is set to the first rank; the user B to the second rank; and the user A to the third rank. In this manner, the face frame processing unit 138 sets the reference (b) higher than the reference (a) and sets the rank of a user who is recognized newly by the face authentication unit 136.

It is assumed that, while the face frame processing unit 138 determines the priority order of registered users whose image is picked up by the camera 7, as a result of new image pickup of the users D and E, the rank of the user B changes to the fourth rank. At this time, the rank of the user A is the fifth rank, and the face frame processing unit 138 displays a face frame 210 for each of the users B, C, D and E ranked to one of the first to fourth ranks. Here, if the user B goes out of detection by the face authentication unit 136, then the face frame processing unit 138 erases the face frame 210b of the user B and displays the face frame 210a of the user A. The face frame processing unit 138 determines the priority rank in display such that a user who has gone out of detection by the face authentication unit 136 has the lowest rank.

In this manner, the face frame processing unit 138 determines a priority order in display of a face frame 210 among a plurality of registered users whose image is picked up. Further, the face frame processing unit 138 displays face frames 210 within a range of the predetermined upper limit number in accordance with the determined priority order.

From the foregoing, the condition in which the face frame 210b continues to be displayed on the login screen image depicted in FIG. 11 is that four or more registered users are not detected on the login screen image, and as long as the condition is satisfied, the face frame processing unit 138 continues to display the face frame 210b. As described hereinabove, as long as the face frame 210 continues to be displayed, the position designation image processing unit 140 displays a corresponding position designation image 212 in the proximity of the face frame 210. It is to be noted that, if the user B is not detected within a predetermined period of time (for example, for 30 seconds or one minute), then the face frame 210b and the position designation image 212b may be placed into a non-displayed state.

It is to be noted that, if a plurality of face frames 210 overlap with each other, then the face frame processing unit 138 may display only one of the face frames 210.

In the following, an algorithm for determining the position of a position designation image 212 with respect to a face region 204 (face frame 210) is described.

FIGS. 12(a) and 12(b) are views illustrating parameters used in the position determination algorithm. Here, in order to facilitate understandings, XY coordinates are set to the picked up image displaying region 206. However, actually the position designation image processing unit 140 executes an arithmetic operation process on the basis of image data developed in a VRAM or the like. Here, an X axis and a Y axis are set to the lower end and the left end of the picked up image displaying region 206, respectively, and Xmax represents a screen size of the picked up image displaying region 206 in a horizontal direction and Ymax represents a screen size of the picked up image displaying region 206 in a vertical direction. The position designation image processing unit 140 derives coordinate parameters of the face frame 210a of the user A in the following manner.

As depicted in FIG. 12(a), the position designation image processing unit 140 derives reference parameters L, W and H of the face region 204a in the following manner:

L: length of the face frame 210a in the vertical direction
W: width of the face frame 210a in the horizontal direction
H: height of the face region 204a (distance from the lower end of the face region 204a to the lower end of the picked up image displaying region 206)

FIG. 12(b) depicts a state in which, below the face region 204a in the Y-axis direction, the face region 204b of a different user exists in an overlapping relationship. In this case, the position designation image processing unit 140 determines overlap parameters Ho1 and Wo1 in the following manner:

Ho1: distance between the lower end of the face region 204a and the upper end of the face region 204b
Wo1: overlap width, namely, distance between the right end (or left end) of the face region 204a and the left end (or right end) of the face region 204b Furthermore, the position designation image processing unit 140 sets threshold parameters to be used in the position derivation algorithm of the position designation image 212 in the following manner:

It is to be noted that L1=L×α (α is a constant equal to or lower than 1).
Th1: L1×a (a is a constant between 1 and 2)
Th2: L1×d (d is a constant between 0.4 to 0.6)
Th3: W×e (e is a constant between 0.1 to 0.3)
Th4: Ymax×f (f is a constant equal to or smaller than 0.1)

Figure 13:
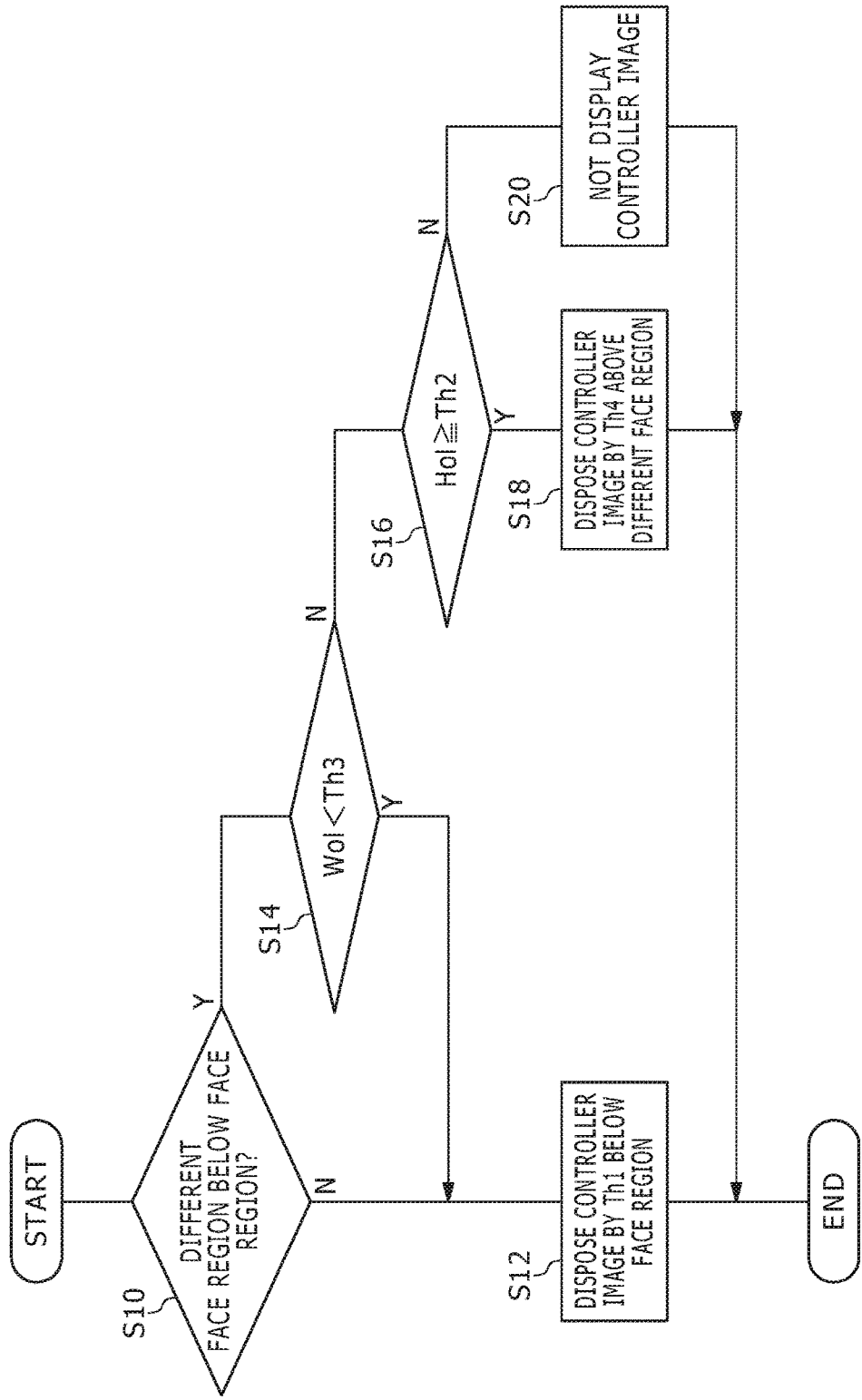
FIG. 13 is a view depicting a flow chart of a position determination process of a position designation image.

FIG. 13 depicts a flow chart of a position determination process of the position designation image 212 by the position designation image processing unit 140. In the following, an example of the position designation image 212 wherein a controller image is called and is disposed below the face frame 210a of the user A is described.

The position designation image processing unit 140 confirms whether a face region of a different user exists in a region below the face region 204a of the user A (S10). In the following, in order to simplify the description, it is assumed that the different user is the user B. Here, as shown in FIG. 12(a), the region below the face region 204a signifies a region of the face width W of the face region 204a extending to a lower end of the screen image in a downward direction of the Y axis, and it is confirmed whether a face region of a different user (for example, the face region 204b) exists in this region.

If a face region of a different user does not exist below the face region 204a (N at S10), then the position designation image processing unit 140 determines to dispose a controller image by Th1 below the face region 204a. FIG. 14(a) depicts a state in which a controller image is disposed by Th1 blow the face region 204a.

On the other hand, if a face region of a different user exists below the face region 204a (Y at S10), then the position designation image processing unit 140 derives the overlap Wo1 in the X-axis direction and determines whether or not the overlap width Wo1 is smaller than Th3 (S14). Here, if the overlap width Wo1 is smaller than Th3 (Y at S14), then the position designation image processing unit 140 determines to dispose a controller image by Th1 below the face region 204a. FIG. 14(b) depicts a state in which a controller image is disposed by Th1 below the face region 204a.

In this manner, if a different face region does not overlap with the face region 204a in the Y-axis direction (namely, in a screen image vertical direction) or, even if a different face region overlaps, if the overlap width Wo1 is small, the position designation image processing unit 140 disposes a controller image (position designation image 212) by Th1 below the face region 204a. It is to be noted that, where the disposition position is very close to the lower end of the screen, the position designation image processing unit 140 disposes a controller image by Th4 above the lower end of the screen image. Consequently, the user A can readily confirm the controller image within the picked up image displaying region 206 and can move the inputting apparatus 6 so as to be adjusted to the display position of the controller image.

On the other hand, if the overlap width Wo1 is equal to or greater than TH3 (N at S14), then the position designation image processing unit 140 determines whether or not the distance Ho1 between the face region 204a and the face region 204b is equal to or greater than Th2 (S16). Here, if the distance Ho1 is equal to or greater than Th2 (Y at S16), then the position designation image processing unit 140 disposes the controller image by Th4 above the upper end of the face region 204b (S18). FIG. 15(a) depicts a state in which the controller image is disposed by Th4 above the upper end of the face region 204b. In this manner, where a different face region 204b overlaps by a great amount with the face region 204a, if the distance in the Y-axis direction between the face regions is great, then the controller image (position designation image 212) is disposed by Th4 above the face region 204b. Consequently, the user A can recognize that the displayed controller image is displayed for the user A itself while the user B can recognize that the controller image is not for the user B itself.

In this manner, when the face region 204b of the user B exists in an overlapping relationship below the face region 204a of the user A, the position designation image processing unit 140 determines the position at which the inputting apparatus 6 is to be displayed in response to an overlap between the two face regions 204a and 204b in the leftward and rightward direction to display a controller image. Consequently, the user can readily confirm whether or not the displayed controller image is for the user itself.

On the other hand, if the distance Ho1 is smaller than Th2 (N at S16), then the position designation image processing unit 140 does not display a controller image (S20). FIG. 15(b) depicts a state in which the face region 204a and the face region 204b are positioned closely to each other and a controller image cannot be displayed. Even if a controller image is displayed in such a case as just described, since there is the possibility that the user may be confused in regard to for whom the controller image is displayed, the position designation image processing unit 140 does not display a controller image.

In this manner, the position designation image processing unit 140 determines the disposition position of a controller image (position designation image 212) and displays the controller image in the picked up image displaying region 206. The position designation image processing unit 140 always displays the position designation image 212 below the face of a corresponding user, and accordingly, the user can intuitively recognize the position designation image 212 displayed for the user itself even if a plurality of position designation images 212 are displayed in the picked up image displaying region 206.

After the position designation image 212 is displayed by such an algorithm as described above, if the user A moves the inputting apparatus 6 so as to be adjusted to the position designation image 212, then the object authentication unit 142 detects that the inputting apparatus 6 exists in the region designated as the position designation image 212 and the login processing unit 144 allows the user A to log in to the OS.

<Login Process 3>

Now, the login process 3 is described. In the login process 3, a user logs in without using the inputting apparatus 6.

If the user depresses the main power supply button 20 of the information processing apparatus 10, then the main power supply to the information processing apparatus 10 is turned on and the input acceptance block 104 accepts depression information of the main power supply as a login request from the user.

After the input acceptance block 104 accepts the login request based on the depression of the main power supply, the picked up image displaying unit 134 displays a picked up image acquired by the image acquisition block 106 on the outputting apparatus 4 which is a display apparatus. Consequently, a live image picked up by the camera 7 is displayed on the outputting apparatus 4, and users who are in front of the outputting apparatus 4 are reflected on the outputting apparatus 4.

As described hereinabove in connection with the login processes 1 and 2, the face authentication unit 136 uses face identification data retained in the registered user information retaining block 150 to detect a face image of a registered user existing in the picked up image. In the login process 3, this face authentication process is positioned as face authentication of the first stage.

Figure 16:
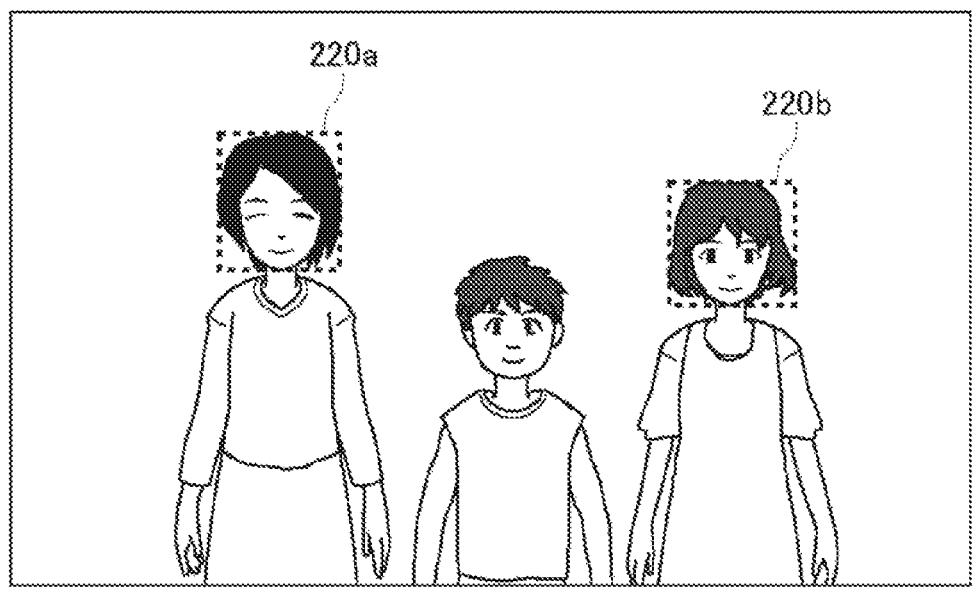
FIG. 16 is a view depicting a face identification result by the face authentication unit.

FIG. 16 depicts a face identification result by the face authentication unit 136. Here, it is discriminated that the left side user is the user A, that the right side user is the user B, and that the middle user is not a registered user whose face image is registered. The face authentication unit 136 sets a face region 220a indicative of the position of the face of the user A (online ID: HANAKO) in the picked up image and a face region 220b indicative of the position of the face of the user B (online ID: SACHIKO) in the picked up image. Then, the face authentication unit 136 provides position coordinates of the face regions 220a and 220b and information for specifying the registered users of the picked up image to the face frame processing unit 138.

The information for specifying the registered users provided from the face authentication unit 136 to the face frame processing unit 138 may be user accounts of the registered users or may be online IDs. The face authentication unit 136 provides the position coordinates of the face regions 220 and the registered user identification information in an associated relationship with each other to the face frame processing unit 138. In particular, in the example depicted in FIG. 16, the face authentication unit 136 provides a combination of the face region 220a and the specification information of the user A and a combination of the face region 220b and the specification information of the user B to the face frame processing unit 138.

The face frame processing unit 138 displays, for each of the registered users detected by the face authentication unit 136, a face frame on the outputting apparatus 4. In the login process 3, this face frame is displayed in order to move and dispose the face when a registered user is to log in. Accordingly, each registered user can log in to the information processing apparatus 10 by placing the own face into the face frame displayed on the outputting apparatus 4.

FIG. 17 depicts a login screen image including a face frame displayed on the outputting apparatus 4. In the login screen image in the login process 3, the picked up image displaying unit 134 live displays a picked up image of the camera 7 in a picked up image displaying region 230.

The face frame processing unit 138 displays, on the basis of the position information of the face regions 220a and 220b provided from the face authentication unit 136 and the information for specifying the registered users of the picked up image, a face frame 222 for each registered user. Here, the face frame 222a is displayed for the user A and the face frame 222b is displayed for the user B. At this time, the face frame processing unit 138 displays the online ID of the user A in the proximity of the face frame 222a and displays the online ID of the user B in the proximity of the face frame 222b. Consequently, the users A and B can know that face recognition of the users A and B themselves has been carried out appropriately. The users A and B know that, upon login, each of them may move the face thereof into the face frame 222a or 222b. It is to be noted that, since the middle user is not a registered user whose face image is registered, the face frame 222 for the middle user is not displayed.

The face frame processing unit 138 applies an ID to each face frame 222 and provides the face frame IDs, position coordinates of the face frames 222 and specification information of the users for whom the face frames 222 are displayed to the face authentication unit 136. It is to be noted that, although the position coordinates of the face frames 222 to be provided from the face frame processing unit 138 to the face authentication unit 136 may be the position coordinates of the face frames 222 themselves, they may be coordinates of rectangles which circumscribe the face frames 222. In the following description, the position coordinates of each face frame 222 itself and the position coordinates of a rectangle which circumscribes the face frame 222 are collectively referred to as position coordinates of a face frame. The position coordinates of a face frame are utilized to detect a face image of a user by the face authentication unit 136.

For example, the face frame processing unit 138 sets the face frame ID of the face frame 222a to "ID1" and sets the face frame ID of the face frame 222b to "ID2," and provides a combination of "ID1," the position coordinates of the face frame 222*a* and the specification information of the user A and another combination of "ID2," the position coordinates of the face frame 222*b* and the specification information of the user B to the face authentication unit 136. Further, the face frame processing unit 138 provides the face frame ID and the specification information of a user whose face frame 222 is displayed to the login processing unit 144. Accordingly, here the face frame processing unit 138 provides a combination of "ID1" and the specification information of the user A and another combination of "ID2" and the specification information of the user B to the login processing unit 144.

FIG. 18 depicts a login screen image in which a user places the face thereof in a face frame. Here, a manner in which the user A moves the face or the body so that the face thereof may enter the face frame 222*a* displayed on the outputting apparatus 4. The face authentication unit 136 monitors whether or not the face of the person is placed in the face frame 222 and discriminates, if the face is placed in the face frame 222, whether the face in the face frame 222 is the face of a registered user using the face identification data retained in the registered user information retaining block 150.

The face authentication unit 136 can monitor, on the basis of the position coordinates of the face frame 222 provided from the face frame processing unit 138, whether a face of a person is placed in the face frame 222. The face recognition algorithm is such as described above, and if it is estimated that the face of a person is placed in the face frame 222, then the face authentication unit 136 derives characteristic amount data at the location. Then, the face authentication unit 136 compares the derived characteristic amount data with the face identification data retained in the registered user information retaining block 150 and decides that the extracted face is the face of a registered user. It is to be noted that the face authentication unit 136 is notified of a combination of the face frame ID, position coordinates of the face frame 222 and specification information of the user for whom the face frame 222 is displayed from the face frame processing unit 138. Thus, the face authentication unit 136 compares the characteristic amount data of the face image of the person included in the face frame 222 with the face identification data of the user for whom the face frame 222 is displayed. Since the face authentication unit 136 is notified of the users, who are to be included in the face frames 222, in advance, the face authentication unit 136 need not compare the characteristic amount data of the faces included in the face frames 222 with the face identification data of all registered users and can carry out a face recognition process efficiently. At this time, the face authentication unit 136 may discriminate that the face of a registered user is placed in each face frame 222 by detecting that the face of the registered user remains placed in the face frame 222 for a predetermined period of time (for example, for several seconds).

In the example of FIG. 18, the face authentication unit 136 discriminates that the face placed in the face frame 222*a* is the face of the user A. In the login process 3, the process just described is positioned as face authentication of the second stage. By the face authentication at the first stage and the second stage, the user authentication upon login is ended.

If the face authentication unit 136 detects that the face of the user A is placed in the face frame 222*a*, then it notifies the login processing unit 144 of the face frame ID for specifying the face frame 222*a* and the user specification information for specifying the user A. As described hereinabove, the login processing unit 144 has the face frame IDs and the specification information of the users, for whom the face frames 222 are displayed, conveyed thereto from the face frame processing unit 138 in advance. When the face frame IDs and the user specification information are conveyed from the face authentication unit 136, the login processing unit 144 extracts the user identification information associated with the face frame IDs conveyed from the face frame processing unit 138 and discriminates the coincidence degree between pieces of the user specification information. Here, in both pieces of user specification information, the specification information of the user A is conveyed for the face frame ID of ID1, and accordingly, the login processing unit 144 recognizes that the face of the user A is detected in the face frame 222*a* displayed for the user A. Consequently, the login processing unit 144 allows the user A to log in to the information processing apparatus 10.

FIG. 19 depicts an execution flow chart of a login process of the present embodiment. If the input acceptance block 104 accepts a login request first, then it notifies the management block 100 of this. If the management block 100 accepts the login request, then the face authentication unit 136 executes a face identification process (S30) and discriminates whether or not the picked up image includes a user whose face image is registered (S32). It is to be noted that the face authentication unit 136 preferably discriminates at this time whether a registered user who does not log in as yet is included. If the picked up image does not include a user whose face image is registered but who does not log in as yet (N at S32), then the process determination section 120 determines the login process 1 as a login process to be executed and the login controlling section 130 executes the login process 1 (S34).

On the other hand, if the picked up image includes at least one user whose face image is registered (Y at S32), then the login controlling section 130 decides whether or not an inputting apparatus 6 is connected (S36). It is to be noted that, at S36, the login controlling section 130 refers to the login user storage unit 146 to discriminate whether or not an inputting apparatus 6 which does not log in as yet is connected to the information processing apparatus 10, and when an inputting apparatus 6 which does not log in as yet exists (Y at S36), the process determination section 120 determines the login process 2 as a login process to be executed and the login controlling section 130 executes the login process 2 (S38). On the other hand, if an inputting apparatus 6 which does not log in as yet and is connected to the information processing apparatus 10 does not exist (N at S36), then the process determination section 120 determines the login process 3 as a login process to be executed and the login controlling section 130 executes the login process 3 (S40).

In this manner, the process determination section 120 determines a login process to be executed in response to a user whose image is included in a picked up image or presence or absence of a connection to a game controller. Since this determination process is automatically carried out without bothering the user, the user is provided with a user interface suitable for an own situation and simple and easy login operation can be implemented. It is to be noted that, if the user utters a predetermined command during execution of the login process 3, then the microphone 108 may accept the utterance and the process determination section 120 may change over the login process to be executed from the login process 3 to the login process 1 in response to the utterance.

The present invention has been described above in connection with the embodiment thereof. The embodiment is exemplary, and it is recognized by those skilled in the art that various modifications are possible to the combination of the components and the processes of the embodiment and that also they fall within the scope of the present invention. While, in the description of the embodiment, it is described that, when a login pass code is set, it is sought to input a login pass code in the login process 1, it may be sought to input a login pass code, for example, also in the login processes 2 and 3.

While, in the login process 2, the face frame processing unit 138 displays the face frame 210 to notify the user that the user can carry out login operation, an indicator other than the face frame 210 may be used to notify the user that the user can carry out login operation. For example, only online IDs of users who can carry out login operation may be presented, or, for example, an arrow mark indicating a login target may be displayed in the proximity of the face or the like so that the user can recognize that the user can log in.

Further, in the login process 2, the size of the position designation image 212 may be set in accordance with the size of the face region 204 or the distance to the user.

Further, in the login process 2, the object authentication unit 142 can detect the presence of an inputting apparatus 6 in a designated region by color recognition on the basis of the emission color of the light emitting section 85. Where the camera 7 is a stereo camera, a space image may be picked up by one of the cameras and is displayed by the picked up image displaying unit 134 while an image for detecting the emission color therefrom is picked up by the other camera such that an inputting apparatus 6 is detected by color recognition by the object authentication unit 142. It is to be noted that the object authentication unit 142 may detect the presence of an inputting apparatus 6 in a designated region by a recognition technology such as shape recognition.

REFERENCE SIGNS LIST

1 . . . Information processing system, 4 . . . Outputting apparatus, 6 . . . Inputting apparatus, 7 . . . Camera, 10 . . . Information processing apparatus, 85 . . . Light emitting unit, 100 . . . Management unit, 102 . . . Communication unit, 104 . . . Input acceptance unit, 106 . . . Image acquisition unit, 108 . . . Microphone, 110 . . . Emission color determination unit, 120 . . . Process determination unit, 130 . . . Login controlling unit, 132 . . . Selection image displaying unit, 134 . . . Picked up image displaying unit, 136 . . . Face authentication unit, 138 . . . Face frame processing unit, 140 . . . Position designation image processing unit, 142 . . . Object authentication unit, 144 . . . Login processing unit, 146 . . . Login user storage unit, 150 . . . Registered user information retaining unit, 200 . . . Focus frame, 202 . . . Small window region, 204 . . . Face region, 206 . . . Picked up image displaying region, 210 . . . Face frame, 212 . . . Position designation image, 220 . . . Face region, 222 . . . Face frame, 230 . . . Picked up image displaying region

INDUSTRIAL APPLICABILITY

The present invention can be utilized in technical fields which involve a user authentication process.

The invention claimed is:

1. An information processing apparatus, comprising:
a picked up image displaying unit configured to display a picked up image on a display unit;
a face authentication unit configured to detect whether any faces within the picked up image include a face of a registered user;
an image processing unit configured to display a position designation image on the display unit, the position designation image for designating a position of an object for the registered user, where the object is not a face of the registered user and where the object is included in the picked up image for the registered user;
an object authentication unit configured to detect that an object image of the object is included in a region designated by the position designation image; and
a login processing unit configured to allow the registered user to log in when the object authentication unit detects that the object image is included in the designated region.

2. The information processing apparatus according to claim 1, wherein the image processing unit displays the position designation image for designating a position on the lower side of a face image of the registered user on the display unit.

3. The information processing apparatus according to claim 1, wherein the image processing unit determines, where a face region of a different user exists below a face region of the registered user in the picked up image, the position of the object in response to an overlap of the two face regions in a leftward and rightward direction.

4. The information processing apparatus according to claim 1, wherein
the object has a light emitting portion which emits light, and
the object authentication unit detects that the object image is included in the designated region by detecting an emission color in the designated region.

5. The information processing apparatus according to claim 1, wherein, in the picked up image, the registered user is detected using face identification data.

6. An apparatus having a micro-processor executing a program for causing the apparatus to carry out actions, comprising:
displaying a picked up image on a display unit;
detecting whether any faces within the picked up image include a face of a registered user;
displaying a position designation image on the display unit, the position designation image for designating a position of an object for the registered user, where the object is not a face of the registered user and where the object is included in the picked up image for the registered user;
detecting that an object image of the object is included in a region designated by the position designation image; and
allowing the registered user to log in when the object authentication unit detects that the object image is included in the designated region.

7. A non-transitory, computer-readable recording medium storing a program, which when executed by a computer, causes the computer to carry out actions, comprising:
displaying a picked up image on a display unit;
detecting whether any faces within the picked up image include a face of a registered user;
displaying a position designation image on the display unit, the position designation image for designating a position of an object for the registered user, where the object is not a face of the registered user and where the object is included in the picked up image for the registered user;
detecting that an object image of the object is included in a region designated by the position designation image; and allowing the registered user to log in when the object authentication unit detects that the object image is included in the designated region.

* * * * *